(12) United States Patent
Gygi et al.

(10) Patent No.: US 11,186,130 B2
(45) Date of Patent: Nov. 30, 2021

(54) SLIP HITCH SYSTEM AND METHODS OF USE

(71) Applicants: Scott Gygi, Skandia, MI (US); Ernest Witzel, Castana, IA (US)

(72) Inventors: Scott Gygi, Skandia, MI (US); Ernest Witzel, Castana, IA (US)

(*) Notice: Subject to any disclaimer, the term of this patent is extended or adjusted under 35 U.S.C. 154(b) by 203 days.

(21) Appl. No.: 16/584,886

(22) Filed: Sep. 26, 2019

(65) Prior Publication Data

US 2020/0094636 A1 Mar. 26, 2020

Related U.S. Application Data

(60) Provisional application No. 62/737,085, filed on Sep. 26, 2018.

(51) Int. Cl.
*B60D 1/36* (2006.01)
*A01B 63/111* (2006.01)

(52) U.S. Cl.
CPC .............. *B60D 1/36* (2013.01); *A01B 63/111* (2013.01)

(58) Field of Classification Search
CPC .... B60D 1/36; B60D 2001/008; B60D 1/075; A01B 63/111; A01B 59/062
See application file for complete search history.

(56) References Cited

U.S. PATENT DOCUMENTS

| | | | | |
|---|---|---|---|---|
| 5,423,394 A | * | 6/1995 | Kendle | A01B 59/048 172/439 |
| 6,478,094 B2 | | 11/2002 | Alexander et al. | |
| 6,769,496 B2 | * | 8/2004 | Casali | A01B 59/004 172/439 |
| 8,382,207 B2 | * | 2/2013 | Altemeier | G05G 11/00 298/22 P |
| 10,899,182 B2 | * | 1/2021 | Lasater | A01B 59/042 |
| 2097/0000673 | | 1/2007 | Farnsworth et al. | |
| 2007/0169951 A1 | | 7/2007 | Clement et al. | |
| 2012/0261899 A1 | * | 10/2012 | Ockunzzi | B60D 1/075 280/416.1 |

FOREIGN PATENT DOCUMENTS

EP 3138373 3/2017

* cited by examiner

*Primary Examiner* — Phung Nguyen
(74) *Attorney, Agent, or Firm* — Device Patent LLC

(57) ABSTRACT

Disclosed is a slip hitch system for coupling and uncoupling trailers from tractors having a three point lift. The slip hitch system comprises a tractor component mounted directly to the three point lift or in other embodiments to a standard 3 point hitch connected to the tractor's 3 point lift. A trailer component is configured for mating with the tongue of one or more trailers to be moved. A tractor plate on the tractor component is configured for seating within a capture space of the trailer component. Elevation of the tractor's 3 point lift consequently lifts the trailer component and trailer tongue for trailer relocation. Once relocated, the 3 point lift is lowered and the trailer and tractor components are separated while the operator may remain in the tractor cab. Also disclosed are various locking mechanisms between the tractor and trailer components and methods of use.

20 Claims, 20 Drawing Sheets

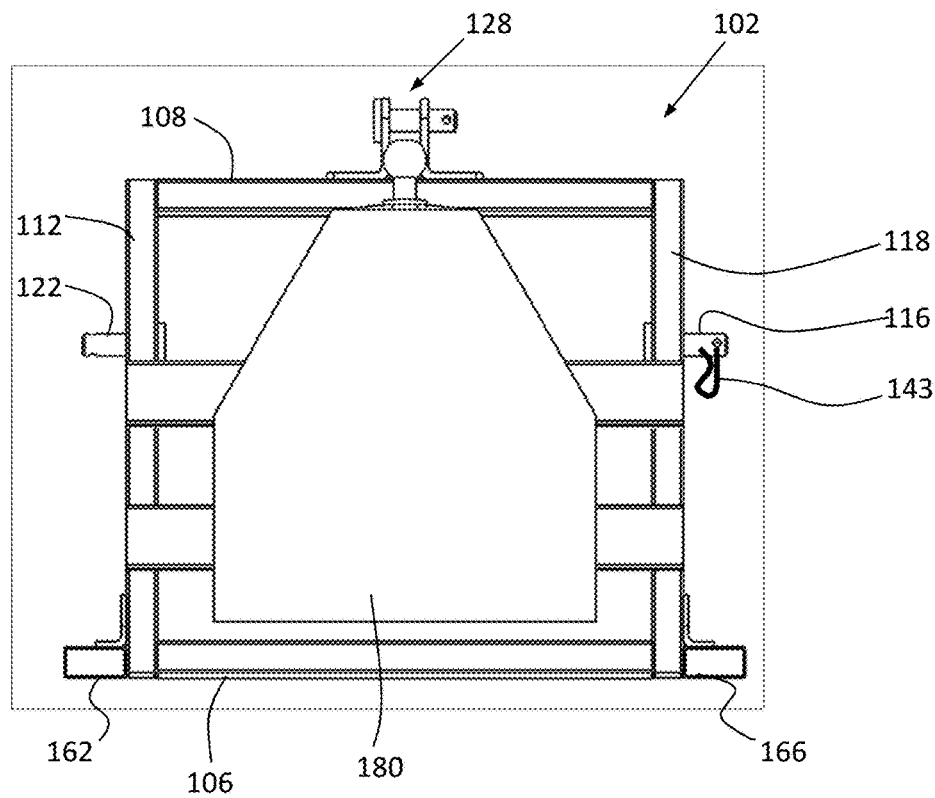
FIGURE 3
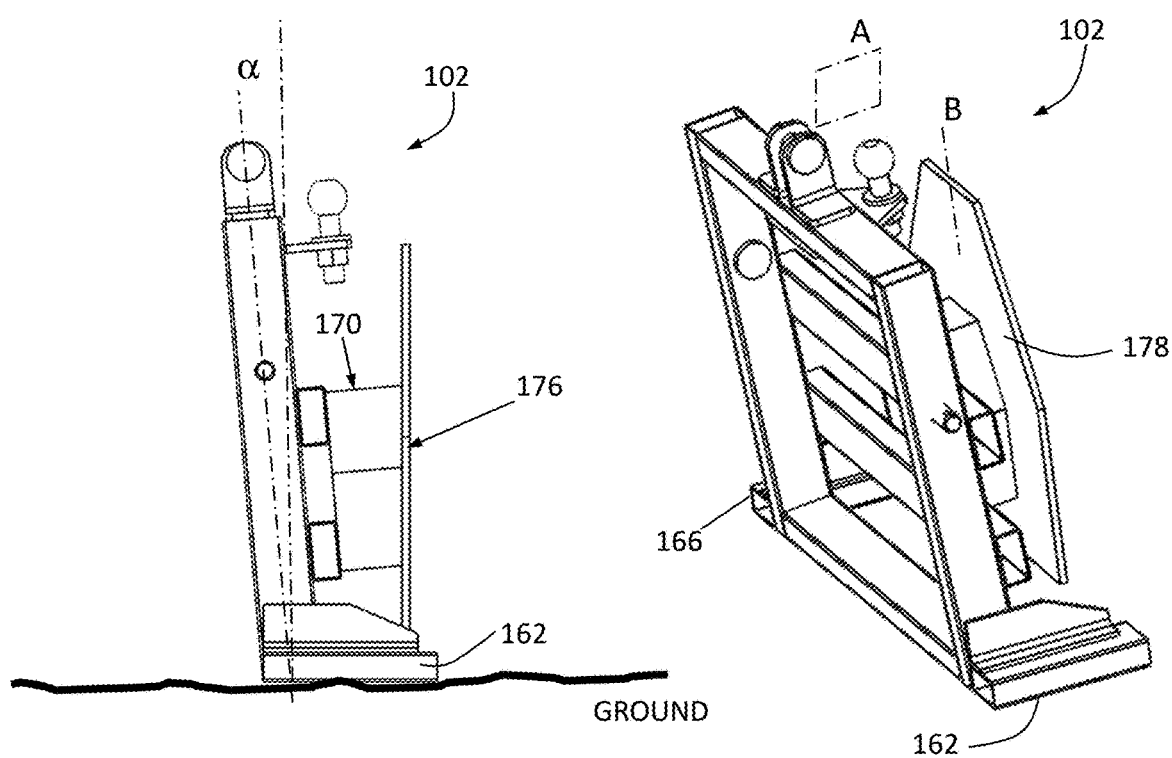
FIGURE 4
FIGURE 5

UNCOUPLED CONFIGURATION

SLIP HITCH SYSTEM AND METHODS OF USE

CROSS REFERENCE TO RELATED APPLICATIONS

This application claims priority to Provisional Patent Application No. 62/737,085 filed Sep. 26, 2018, the entire disclosure of which is hereby incorporated by reference and relied upon.

BACKGROUND OF THE INVENTION

Field of the Invention. The invention relates generally to tractor-trailer coupling systems, and more particularly to ergonomically beneficial tractor-trailer coupling and uncoupling systems.

Description of Related Art. Users of tractor equipment recognize the tremendous physical effort and risk of injury associated with repetitively climbing up and down the tractor as one attempts to align the tractor hitch with the trailer and operating the associated hitch mechanisms. In addition, manually connecting and disconnecting trailers wastes time, money, and fuel.

What is needed are robust tractor-trailer coupling and uncoupling systems that provide users the means to couple and uncouple a tractor and a trailer without need of climbing up and down from the tractor cab or tractor seat during the process.

SUMMARY OF THE INVENTION

The article of invention is referred herein as a Slip Hitch System for coupling and uncoupling trailers from tractors having a three point lift. This procedure can now be done without need for the tractor operator to leave the cab of the tractor.

In one preferred form, a slip hitch comprises a tractor component and a trailer component.

In one form, a tractor component is configured to releasably fix to a 3-point tractor hydraulic lift.

In one form, a tractor component is configured to releasably fix to a 3-point hitch.

In one form, a tractor component comprises a tractor support frame.

In one form, a tractor support frame comprises a top base support.

In one form, a tractor support frame comprises a bottom base support.

In one form, a tractor support frame is absent a bottom base support.

In one form, the top base support and bottom base supports are positioned generally horizontal.

In one form, a tractor support frame comprises a first side support.

In one form, a tractor support frame comprises a second side support.

In one form, the first side support and the second side support are positioned generally vertical.

In one form, a tractor support frame comprises a first cross support extending between the first side support and the second side support.

In one form, a tractor support frame comprises a second cross support extending between the first side support and the second side support.

In one form, the first cross support is positioned inferiorly to the top base support.

In one form, the second cross support is positioned inferiorly to the first cross support.

In one form, a first lift pin extends generally horizontal from a first side support.

In one form, a first side support comprises a first pin hole for seating a first lift pin.

In one form, a second lift pin extends generally horizontal from a second side support.

In one form, a second side support comprises a second pin hole for seating a second lift pin.

In one form, the first lift pin and second lift pin extend laterally from each respective first side support and second side support.

In one form, a first side bracket with a first pin hole extending therethrough, extends toward a front end from a first side support for attachment to a three point hitch of a tractor.

In one form, a second side bracket with a second pin hole extending therethrough, extends toward a front end from a second side support for attachment to a three point hitch of a tractor.

In one form, one or more of a first side bracket and a second side bracket comprise an elongate first side arm and an opposed elongate second side arm.

In one form, a first pin hole extends through a front end of the first side bracket and a second pin hole extends through a front end of the second side bracket.

In one form, a third pin bracket extends from a top base support.

In one form, the third pin bracket extends from a superior surface of a top base support.

In one form, a third pin bracket comprises a first L bracket and a second L bracket.

In one form, the third pin bracket is centered along a mid-plane of the tractor support frame.

In one form, the first L bracket and second L bracket comprise a third pin hole extending therebetween for seating a third lift pin.

In one form, a third pin bracket comprises a first top bracket and a second top bracket.

In one form, the first top bracket and second top bracket comprise a third pin hole extending therebetween for seating a third lift pin therein.

In one form, a third lift pin is seated within the third pin hole.

In one form, each of the first lift pin, second lift pin, and third lift pin comprise an enlarged pin head.

In one form, each of a first lift pin, second lift pin, and third lift pin comprise a retension hole for seating a lock pin.

In one form, a lock pin is seated in one or more of a retension hole of a first lift pin, a second lift pin, and a third lift pin.

In one form, the first lift pin, the second lift pin, and the third lift pin are positioned to be received by each three point arm of a three point hitch of a tractor for releasable fixation therebetween.

In one form, a first hitch mount extends from the top base support.

In one form, a first hitch mount is in the form of a plate.

In one form, a first hitch mount comprises a hitch hole for mounting a hitch ball therein.

In one form, a hitch ball is seated in a hitch hole.

In one form, a hitch ball is secured in a hitch hole using a hitch nut.

In one form, the hitch hole is spaced extends rearward from the tractor support frame on the first hitch mount.

In one form, the first hitch mount is fixed to an inferior side of the top base support.

In one form, the first hitch mount is fixed to a superior side of the top base support.

In one form, the first hitch mount is fixed between the first top bracket and second top bracket.

In one form, a hitch ball is centered along a mid-plane (plane A) of the tractor support frame.

In one form, a hitch ball seated in a first hitch mount is used for convenience to relocate a trailer attached to the hitch ball in the absence of a trailer component.

In one form, a first foot is fixed at an inferior end of the first side support.

In one form, a second foot is fixed at an inferior end of the second side support.

In one form, the first foot and a second foot are extended to create a stable base with respect to the ground.

In one form, the first foot and second foot are manufactured of u-channel or boxed tubing.

In one form, when one or more of a first foot and a second foot are positioned on a horizontal ground surface, the tractor support frame is angled forward from vertical position.

In one form, when one or more of a first foot and a second foot are positioned on a horizontal ground surface, the tractor support frame is standing generally vertical.

In one form, a first foot bracket offers additional support to a first foot.

In one form, a second foot bracket offers additional support to a second foot.

In one form, one or more of a first foot and a second foot are positioned lateral to the the respective first side support and second side support.

In one form, one or more of a first foot and a second foot are positioned inferior to the respective first side support and second side supports.

In one form, a tractor plate extension is fixed to one or more of a first cross support and a second cross support at a frame face.

In one form, a tractor plate extension is fixed to a tractor plate at a plate face.

In one form, a tractor plate extension is shaped to create a non-parallel orientation between the tractor plate and the tractor support frame.

In one form, a tractor plate extension is wider superiorly than inferiorly.

In one form, a tractor plate extension comprises a plurality of plate extension blocks.

In one form, the plate extension blocks are generally all the same length.

In one form, two plate extension blocks are opposed across plane A and extend distally from a forward face of the first cross support.

In one form, two plate extension blocks are opposed across plane A and extend to a rear end from a rear face of the second cross support.

In one form, a tractor plate extension is generally U-shaped.

In one form, the tractor plate stands generally vertical when the tractor support frame is standing on its first foot and second foot on a generally horizontal surface.

In one form, the third pin bracket is positioned superior to a hitch ball seated in the first hitch mount.

In one form, the third pin bracket is positioned level or inferior to a hitch ball seated in the first hitch mount.

In one form, a tractor plate comprises a front surface, a rear surface, a first side surface, a second side surface, a top surface, a bottom surface, a first oblique surface, and a second oblique surface.

In one form, a tractor plate's front surface is opposed to the rear surface.

In one form, a tractor plate's first side surface is opposed to the second side surface.

In one form, a tractor plate's top surface is opposed to the bottom surface.

In one form, a lock base extends to the front from a tractor support frame.

In one form, a lock base extends to the front from a front side of a first cross support.

In one form, a lock base resides within a plane A of a tractor support frame.

In one form, the lock base is fixed to a front side of a first cross support using one or more of welds and fasteners.

In one form, the lock base comprises a superiorly directed lock arm extending from the from the lock base.

In one form, a first lock aperture extends through the lock arm for coupling with a first end of a first actuator.

In one form, a tractor plate comprises a second lock aperture extending between a front surface and a rear surface for passage of a lock plunger of a first actuator.

In one form, a plunger guide extends from a front surface of a tractor plate.

In one form, a plunger guide is in the form of a tube segment fixed to the front surface of a tractor plate.

In one form, a trailer plate comprises a third lock aperture extending between a front surface and a rear surface for passage of a lock plunger of a first actuator.

In one form, the first lock aperture, the second lock aperture, and the third lock aperture are aligned within a single plane A.

In one form, the second lock aperture and the third lock aperture are aligned along a common axis E.

In one form, the second lock aperture and the third lock aperture are aligned along common axis E which also intersects axis F of the first lock aperture.

In one form, a first actuator comprises a first end for coupling with the first lock aperture of the lock arm and an opposed translatable lock plunger.

In one form, the first actuator is one of pneumatic, hydraulic, and electric.

In one form, the position of a lock plunger of a first actuator is controlled by a user from controls located within a cab of a tractor.

In one form, the translatable lock plunger is slidingly housed within the plunger guide.

In one form, the first actuator is hydraulic and connected by hydraulic lines to a hydraulic pump located on one of: the associated tractor and the tractor component.

In one form, a trailer component comprises a trailer support frame.

In one form, a trailer support frame comprises a superior strut.

In one form, a trailer support frame comprises a mid strut.

In one form, a trailer support frame comprises an inferior strut.

In one form, a trailer support frame comprises a first side strut.

In one form, a trailer support frame comprises a second side strut.

In one form, a trailer support frame comprises a first pod.

In one form, a trailer support frame comprises a second pod.

In one form, the superior strut is positioned superior to the mid strut and inferior strut.

In one form, the mid strut is positioned between the superior strut and inferior strut.

In one form, one or more of the superior strut, mid-strut, and inferior struts, extend between a first side strut and a second side strut.

In one form, one or more of the superior strut, the mid strut, and the inferior strut are substantially horizontal.

In one form, a trailer support frame is wider inferiorly.

In one form, a trailer support frame is narrower superiorly.

In one form, a trailer support frame is 'A' shaped.

In one form, a first pod is positioned below a first side strut.

In one form, a second pod is positioned below a second side strut.

In one form, a first pod and a second pod are spaced to create a base of support for an upstanding trailer support frame.

In one form, the first pod and the second pod are positioned generally perpendicular to the first and second side struts to create a base of support for an upstanding trailer support frame.

In one form, a trailer plate is fixed to a trailer support frame.

In one form, a midline of a trailer plate is aligned with a mid-plane of a trailer support frame.

In one form, a trailer plate comprises a front face and an opposing rear face, a first side face opposing a second side face, a top face opposing a bottom face, a first oblique face, and a second oblique face.

In one form, a top face of a trailer plate is positioned superior to a trailer support frame.

In one form, a capture plate comprises an inner face opposing an outer face, an upper face opposing a lower face, a first lateral face, a second lateral face, a first medial face, a second medial face, a first end face, and a second end face.

In one form, a capture plate is substantially 'V' or 'U' shaped.

In one form, a capture spacer spaces a capture plate from a trailer support frame.

In one form, a capture spacer comprises a medial spacer, a first spacer, and a second spacer.

In one form, the capture spacer comprises a front spacer face and a rear spacer face.

In one form, the first medial face and second medial face and lower face (if present) define a clearance window.

In one form, the front face of a trailer plate, the inner face of a capture plate, and the inner spacer face of a capture spacer define a capture space.

In one form, the capture space is configured in size and shape to removably receive a tractor plate therein.

In one form, a capture space comprises oblique sides to cause a consequent re-centering of a tractor plate if misaligned during coupling.

In one form, a capture space is sufficiently large wherein a user can back up a tractor plate and be received within a capture space without direct view of the components being coupled.

In one form, a second hitch mount is fixed to a surface of a mid-strut of a trailer support frame.

In one form, a hitch ball extends through a hitch hole of the second hitch mount and secured with a hitch nut.

In one form, the hitch hole of the second hitch mount is positioned to the rear of the trailer support frame.

In one form, the hitch hole is positioned vertically.

In some forms, components of a slip hitch system are fixed together by one or more of welds, holes and fasteners, and fixation plates.

In one form, a slip hitch system is configured for releasable mounting to a standard 3-point hitch that is mounted to a tractor on its 3-point hydraulic lift system.

In one form, a three point hitch is into the tractor component.

In one form, a tractor support frame comprises a first side bracket, a laterally opposed second side bracket, and superiorly placed third pin bracket thereby integrating a 3-point hitch into the tractor support frame for coupling with a first three point arm, a second three point arm, and a third three point arm of a tractor's 3 point hydraulic lift system.

In one form, a 3-point hitch comprises a first lift pin and second lift pin with one or more third pin holes for housing a third lift pin. Each of these couple with respective first three point arm, second three point arm, and third three point arm for controlled height of 3-point hitch.

In one form, a three point hitch comprises a balless receiver typically of a square profile defined by balless wall.

In one form, the balless receiver comprises a central axis extending from front to rear and is sized to slidingly house a balless mount which is typically in the form of a square tube having a hole for pinning the balless mount within the balless receiver for releasable fixation.

In one form, the rear end of the balless mount is fixed to the tractor plate by welding, fasteners or other means known in the art.

In one form, the balless mount is fixed generally perpendicular to a front surface of the tractor plate.

In one form, balless fixation provides additional fixation support of the balless mount to the tractor plate and may be in the form of a pair of opposed lateral plates, and inferior placed plate(s).

In one form, welds or fasteners may be used at various locations within the slip hitch system to join components to each other.

In one form, a trailer plate serves as the primary structure of the trailer component.

In one form, a capture plate integrates the functions of both the capture spacer and capture plate into a single metal part.

In one form, a capture plate is formed of sheet metal although other fabrication methods may be used.

In one form, a capture plate is fixed to a trailer plate to create a clearance window and capture space on the front side of the trailer plate for receiving the superior end of the tractor plate therein in a coupled configuration.

In one form, a plunger link assembly is secured to the rear side of a trailer plate. When the trailer plate is raised from the ground, the linkage is activated as an interlock such that a trailer tongue cannot be uncoupled from a tractor. When the trailer plate is lowered to the ground, the linkage is activated to release the interlock for uncoupling of a trailer tongue from a tractor.

In one form, fixed to a rear face of a trailer plate is a second hitch mount in the form of a generally square tube. The inside dimensions of the second hitch mount are sized for housing a ball mount therein by sliding engagement.

In one form, second hitch mount fixation is utilized to provide additional fixation support and comprises a pair of generally vertically spaced plates and a horizontal component.

In one form, one of the generally vertical spaced plates serves as a pivot plate with pivot hole extending therethrough which serves as a fixed pivot point for one of the links of plunger link assembly.

In one form, by consequence of the trailer plate resting on ground, a link foot is generally aligned with the inferior end of trailer plate thereby disengaging the locking linkage.

In one form, a plunger link assembly comprises a series of pinned links.

In one form, the plunger link assembly comprises a link foot having a sole configured for engagement with a ground surface.

In one form, the link foot is pivotably secured to a first link which is pivotably secured to a second link, which is pivotably secured to a pivot link, which is pivotably secured to a third link, which is pivotably secured to a plunger link.

In one form, the pivot link comprises a fixed pivot comprising a pin extending to align with a pivot hole of a pivot plate.

In one form, a first link extends vertically through and is supported by a linkage aperture of a second hitch mount.

In one form, a trailer component is consequently elevated when a tractor component is elevated by the tractor's 3 point hydraulic lift.

In one form, a link foot drops causing a consequent chain reaction through the plunger link assembly having the final consequence of a plunger link to translate forward and interlock with a tractor plate thereby preventing their unexpected separation during use.

In one form, vertical dropping of the link foot is limited by interference between a horizontal portion of the first link and an upper surface of second hitch mount.

In one form, a trailer component is consequently lowered when a tractor component is lowered by the tractor's 3 point hydraulic lift. The link foot is forced upward by the ground causing a consequent chain reaction through the linkage having the final consequence of the plunger link to translate rearward and disengaging with tractor plate. This provides unlocking thus enabling an uncoupled configuration between the tractor component and the trailer component.

In one form, in a method of use of one embodiment of a slip hitch system, a tractor component resides generally upright on a ground surface at least partially supported by at least one of a first foot and a second foot. A user backs a tractor having a three point hydraulic lift to the front side of the tractor component. The first three point arm, second three point arm, and third three point arm of the three point hitch are connected to the respective first lift pin, second lift pin, and third lift pin of the tractor component. Each arm is optionally locked by placement of a retension pin through each retension hole. The user activates the three point lift to elevate. If the trailer component is not already coupled (uncoupled configuration), the user locates a trailer component and positions the trailer component upright ground balanced on one or more of a first pod and a second pod. The user backs the tractor towards the trailer component and activates the three point lift to lower the tractor component sufficient for the tractor plate to pass through the clearance window of the trailer component. Once the tractor position places the tractor plate behind the capture plate of the trailer component, the user again activates the three point hydraulic lift to lift the tractor component causing a consequent positioning of the trailer plate within the capture space (coupled configuration). Due to the complementing obliquely positioned inner spacer faces of the capture spacer, the trailer plate self-aligns. If the user so chooses, the user may lock the tractor component to the trailer component to prevent separation during transport.

In one embodiment, the user activates controls within the cab of a tractor causing a lock plunger of a first actuator to extend from a second lock aperture of a tractor plate into third lock aperture of a trailer plate in a locked configuration thus preventing premature separation of the tractor plate and trailer plate. When locking between the tractor component and trailer component is no longer needed, the user activates controls within the cab of the tractor causing the lock plunger of the first actuator to retract from the third lock aperture of the trailer plate thereby allowing separation between the tractor component and trailer component (unlocked configuration). If a trailer is not already attached to a trailer component, the user raises the three point lift then backs the coupled slip hitch system to a trailer tongue. The three point lift is lowered, and a trailer tongue is mounted over a hitch ball extending from the second hitch mount. The user again activates the three point hitch to elevate the trailer component and directs the tractor with coupled trailer to its new destination.

Once at its new destination, the user activates the three point lift such that the tractor plate is lowered sufficiently to ground the trailer component and for the tractor plate to be lowered to clear the capture plate through the clearance window. Given the next trailer to be moved is pre-equipped with a trailer component, the user drives to the next trailer, lowers the tractor component then elevates once coupled. As noted here, it is unnecessary for the user to leave the seat of the tractor once the tractor component is fitted to the three point lift of the tractor, and trailer components are pre-coupled to each trailer.

In a preferred embodiment, the method of use is accordingly adjusted when the three point hydraulic lift is connected to a standard 3 point hitch rather than directly to the tractor component. In this configuration, a balless mount on the tractor component slidingly engages a balless receiver on the 3 point hitch and is pinned thereby securing the tractor component to the 3 point hitch.

In a preferred embodiment, a method of obtaining a locked configuration between the tractor component and trailer comprises use of a plunger link assembly. In this method, anytime the trailer component is lowered to a ground surface, a link foot is pushed superiorly causing consequent translation of a plunger link to engage the tractor component with consequent locking between the tractor and trailer components. In a method of obtaining an unlocked configuration between the tractor component and trailer component, anytime the trailer component is raised from a ground surface, the link foot is lowered by gravity or spring bias causing consequent translation of the plunger link to disengage the tractor component with consequent unlocking between the tractor component and trailer component.

BRIEF DESCRIPTION OF THE SEVERAL VIEWS OF THE DRAWINGS

These and other features and advantages of the present invention will become more readily appreciated when considered in connection with the following detailed description and appended drawings, wherein each drawing is according to one or more embodiments shown and described herein, and wherein:

FIG. 3 depicts a rear view of the tractor component of the slip hitch system of FIG. 1;

FIG. 4 depicts a side view of the tractor component of the slip hitch system of FIG. 1 resting on a ground surface;

FIG. 5 depicts a top perspective view of the tractor component of the slip hitch slip hitch system of FIG. 1;

DETAILED DESCRIPTION OF SELECTED EMBODIMENTS OF THE INVENTION

Select embodiments of the invention will now be described with reference to the Figures. Like numerals indicate like or corresponding elements throughout the several views and wherein various embodiments are separated by letters (i.e. 100A, 100B, 100C). The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The article of invention referred to herein as a Slip Hitch is a system and method for coupling and uncoupling trailers from tractors having a three point tractor hitch without need for the tractor operator to leave the seat of the tractor.

Figure 1:
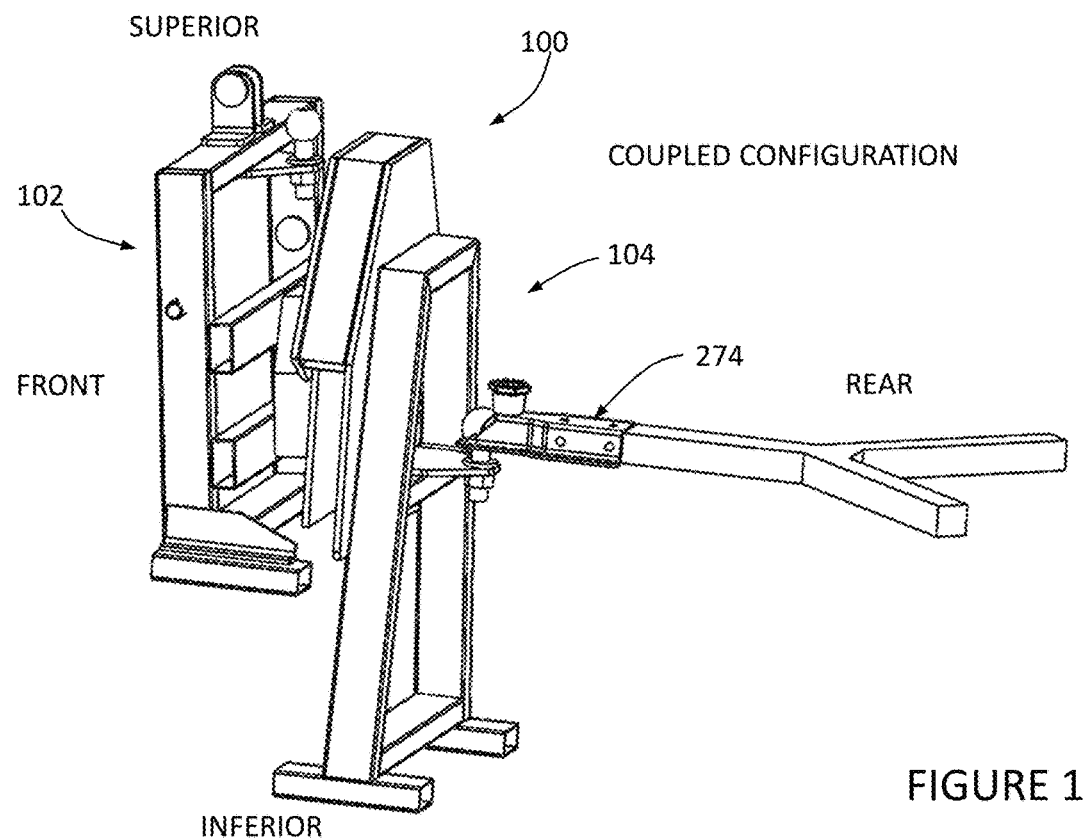
FIG. 1 depicts a top perspective view of a slip hitch system in a coupled configuration.
Figure 2:
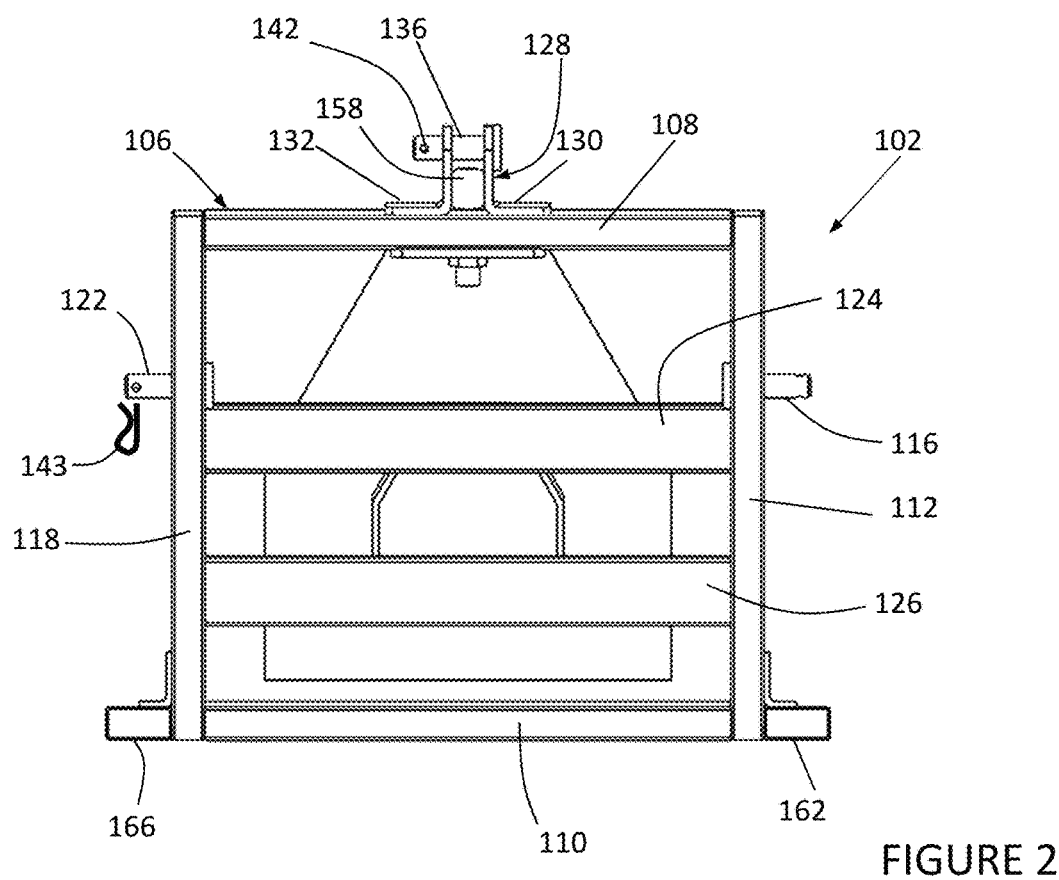
FIG. 2 depicts a front view of the tractor component of the slip hitch system of FIG. 1.
Figure 10:
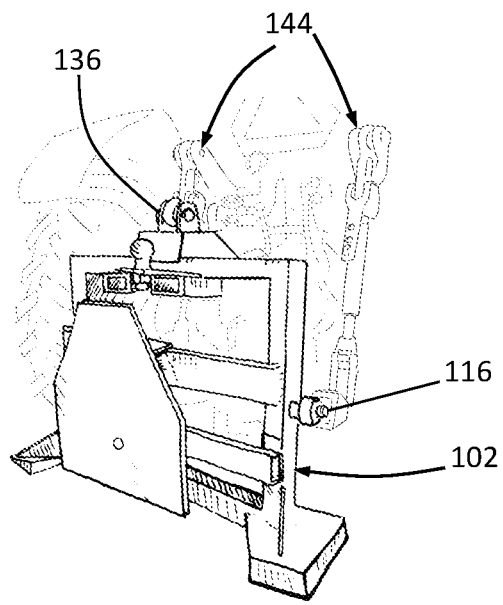
FIG. 10 depicts a rear perspective view of a tractor component of a slip hitch system secured to the 3 point hydraulic lifting system of a tractor.
Figure 11:
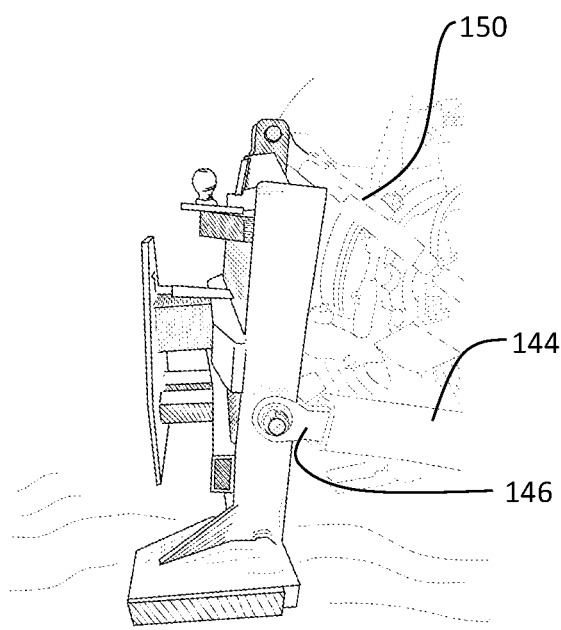
FIG. 11 depicts a side perspective view of a tractor component of a slip hitch system secured to the 3 point hydraulic lifting system of a tractor.
Figure 12:
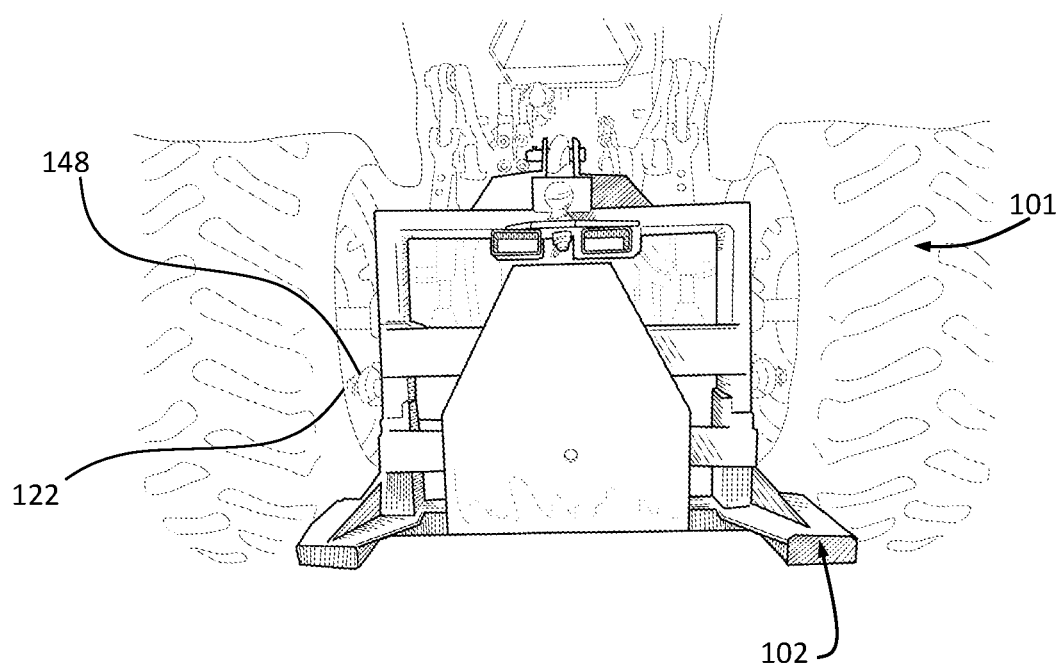
FIG. 12 depicts a rear perspective view of a tractor component of a slip hitch system secured to the 3 point hydraulic lifting system of a tractor.

In a first embodiment illustrated in FIG. 1 that includes a partial view of an attached trailer tongue, a slip hitch system 100 comprises a tractor component 102 and a trailer component 104. As illustrated by the embodiment of FIGS. 10-12, tractor component 102 is configured to releasably fix to a 3-point hydraulic lift 144 of a tractor 101.

As noted in the embodiment of FIGS. 2-6, a tractor component 102 comprises a tractor support frame 106. Tractor support frame 106 comprises a top base support 108 and a bottom base support 110. Top base support 108 and bottom base support 110 are positioned generally horizontal. In addition, tractor support frame 106 comprises a first side support 112 and a second side support 118. The first side support 112 and the second side support 118 are positioned generally vertical. Tractor support frame 106 comprises a first cross support 124 extending between first side support 112 and second side support 118. Tractor support frame 106 also comprises a second cross support 126 extending between the first side support 112 and the second side support 118, with the first cross support 124 positioned inferiorly to the top base support 108 and the second cross support 126 positioned inferiorly to the first cross support 124.

A first lift pin 116 extends generally horizontal from a first side support 112. First side support 112 comprises a first pin hole 114 for seating first lift pin 116 therein. A second lift pin 122 extends generally horizontal from a second side support 118. Second side support 118 comprises a second pin hole 120 for seating a second lift pin 122 therein. Therefore, first lift pin 116 and second lift pin 122 extend laterally from each respective first side support 112 and second side support 118. Third pin bracket 128 extends from top base support 108 preferably from a superior surface of a top base support 108. In this embodiment, third pin bracket 128 comprises a first L bracket 130 and a second L bracket 132 and third pin bracket is centered along a mid-plane A of the tractor support frame 106. Together, first L bracket 130 and second L bracket 132 comprise a third pin hole 134 extending therebetween for seating a third lift pin 136 within the third pin hole 134. First lift pin 116, second lift pin 122, and third lift pin 136 may comprise an enlarged pin head 140 or other forms such as in the form of a headless shaft welded to the corresponding support. In this embodiment, each of a first lift pin 116, second lift pin 122, and third lift pin 136 comprise a retension hole 142 for seating a lock pin or include another locking feature such as a lock collar to keep the system secured to the 3 point hitch. Each lift pin is positioned to extend from tractor support frame 106 to be received by a three point hydraulic lift 144 of a tractor.

In this embodiment, a first hitch mount 138 extends from top base support 108 and is in the form of a plate. First hitch mount 138 comprises a hitch hole 156 wherein a hitch ball 158 is seated in hitch hole 156 and secured using hitch nut 160. Hitch hole 156 is positioned rearward from tractor support frame 106. First hitch mount 138 is fixed to an inferior side of top base support 108. Hitch ball 158 is preferably centered along a mid-plane A of the tractor support frame 106. Hitch ball 158 is seated in first hitch mount 138 and is used to relocate a trailer in the absence of a trailer component 104.

In this embodiment, a first foot 162 is fixed at an inferior end of first side support 112 whereas a second foot 166 is fixed at an inferior end of the second side support 118. Each of first foot 162 and second foot 166 are extended or elongate to create a stable base with respect to the ground. As illustrated in FIG. 4, when one or more of a first foot 162 and a second foot 166 are positioned on a ground surface, tractor support frame 106 is angled a degrees forward from vertical position (i.e. 5 degrees or 10 degrees). In this embodiment, a first foot bracket 164 offers additional support to a first foot 162 and similarly a second foot bracket 168 offers additional support to a second foot 166. Also in this embodiment, one or more of first foot 162 and second foot 166 are positioned lateral to the respective first side support 112 and second side support 118.

Also as illustrated in FIG. 4, tractor plate extension 170 is fixed to one or more of first cross support 124 and second cross support 126 at a frame face 174 (FIG. 6) and is also fixed to a tractor plate 176 at a plate face 172. Tractor plate extension 170 may be shaped to create a non-parallel orientation between the tractor plate and the tractor support frame 106 as noted in that tractor plate extension 170 is wider superiorly than inferiorly. In this embodiment, tractor plate extension 170 is generally U-shaped and tractor plate 176 stands generally vertical as noted in FIG. 4 when tractor support frame 106 is standing on its first foot 162 and second foot 166. In addition, third pin bracket 128 is positioned superior to hitch ball 158.

Figure 6:
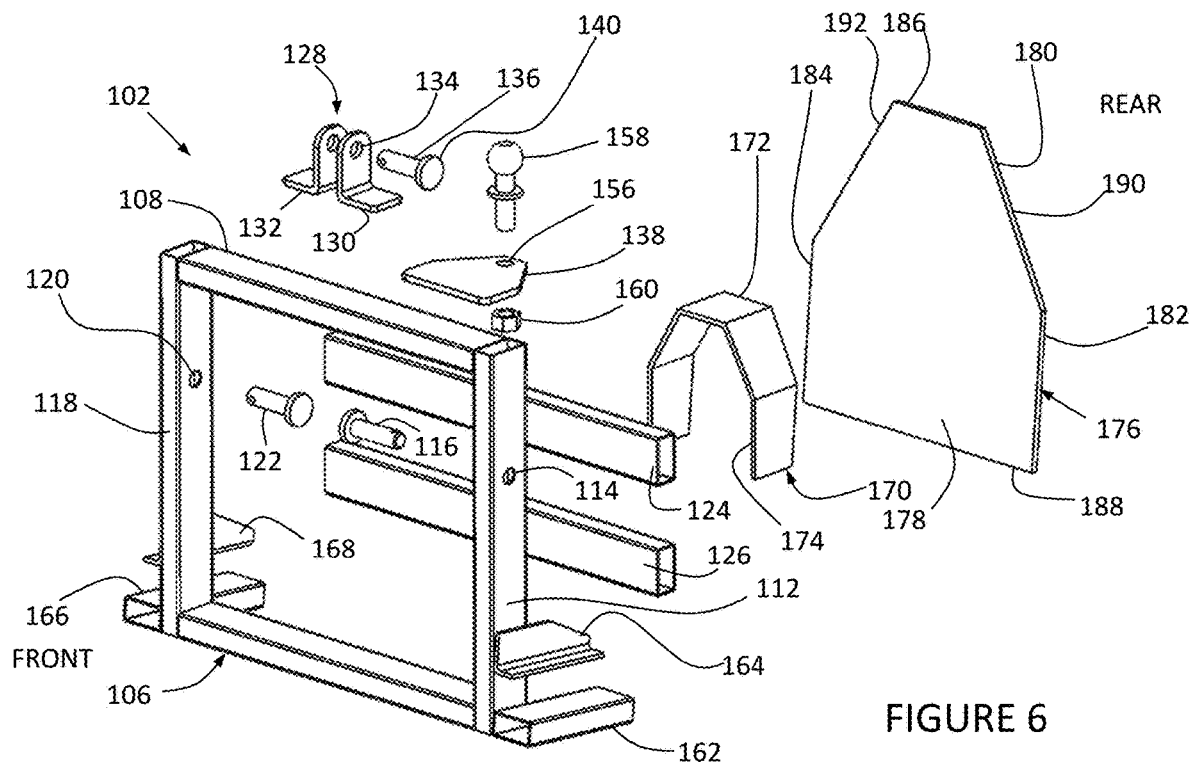
FIG. 6 depicts a top perspective exploded view of the tractor component of the slip hitch system of FIG. 1.

In the embodiment of FIG. 6, tractor plate 176 comprises a front surface 178, a rear surface 180, a first side surface 182, a second side surface 184, a top surface 186, a bottom surface 188, a first oblique surface 190, and a second oblique surface 192. Front surface 178 is opposed to the rear surface 180, first side surface 182 is opposed to the second side surface 184, and top surface 186 is opposed to the bottom surface 188.

Figure 7:
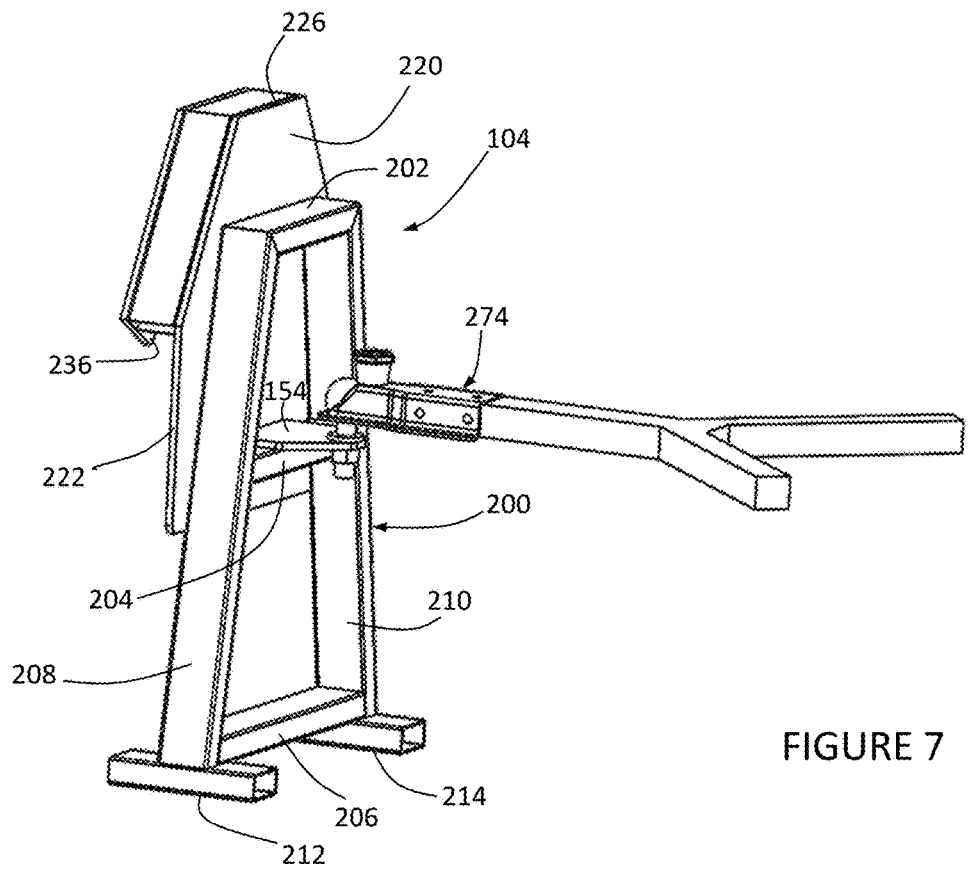
FIG. 7 depicts a top perspective view of the trailer component of the slip hitch system of FIG. 1.

One embodiment of a trailer component 104 is illustrated in FIG. 7 with attached trailer tongue 274. Trailer component 104 comprises a trailer support frame 200. Trailer support frame 200 comprises a superior strut 202, a mid strut 204, an inferior strut 206, a first side strut 208, and a second side strut 210. In addition, trailer support frame 200 comprises a first pod 212 and a second pod 214. Superior strut 202 is positioned superior to the mid strut 204 and inferior strut 206 and mid strut 204 is positioned between superior strut 202 and inferior strut 206.

In this embodiment, one or more of the superior strut 202, mid strut 204, and inferior struts 206, extend between a first side strut 208 and a second side strut 210. Here superior strut 202, mid strut 204, and inferior strut 206 are substantially horizontal. Trailer support frame 200 is wider inferiorly and narrower superiorly. In some embodiments, trailer support frame 200 is 'A' shaped. A first pod 212 is positioned below a first side strut 208 and second pod 214 is positioned below second side strut 210. First pod 212 and second pod 214 are spaced to create a base of support for an upstanding trailer support frame 200 to minimize tippage. Further, first pod 212 and second pod 214 are positioned generally perpendicular to first and second side struts 208, 210 to create a base of support for an upstanding trailer support frame 200.

Figure 8:
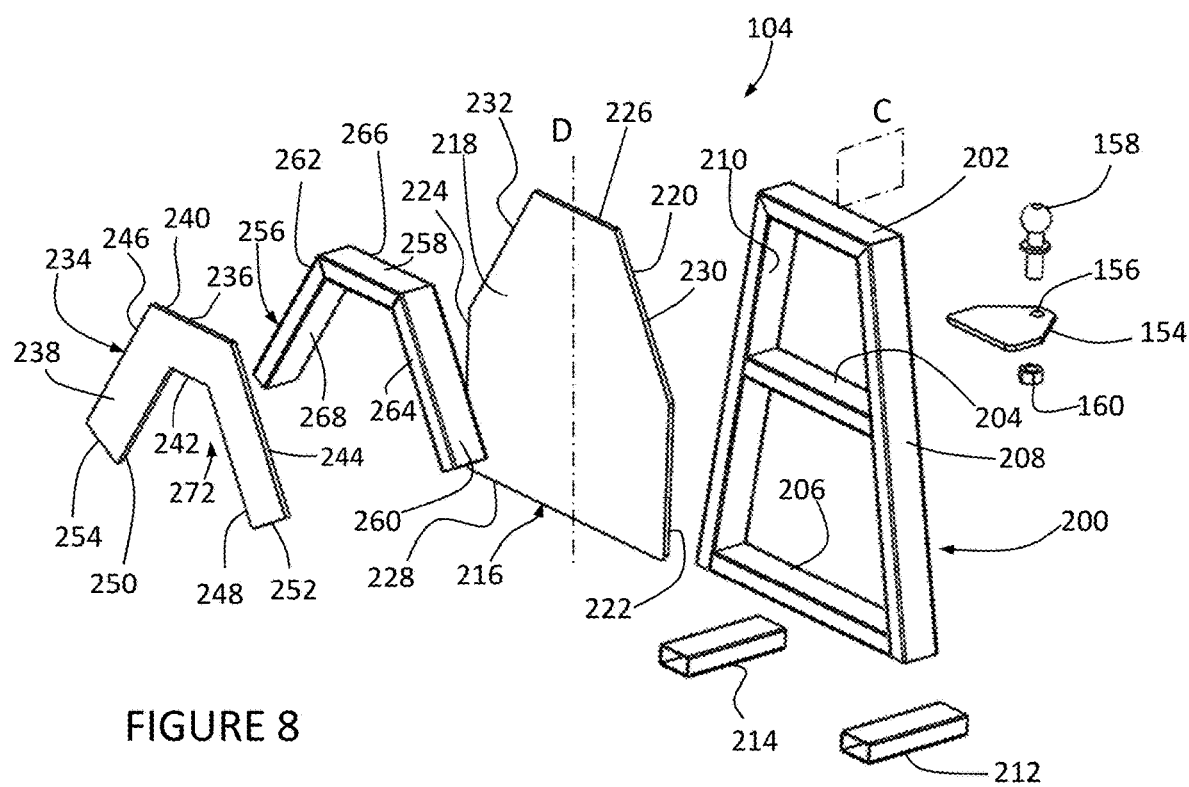
FIG. 8 depicts a top perspective exploded view of the tractor component of the slip hitch system of FIG. 1.
Figure 9:
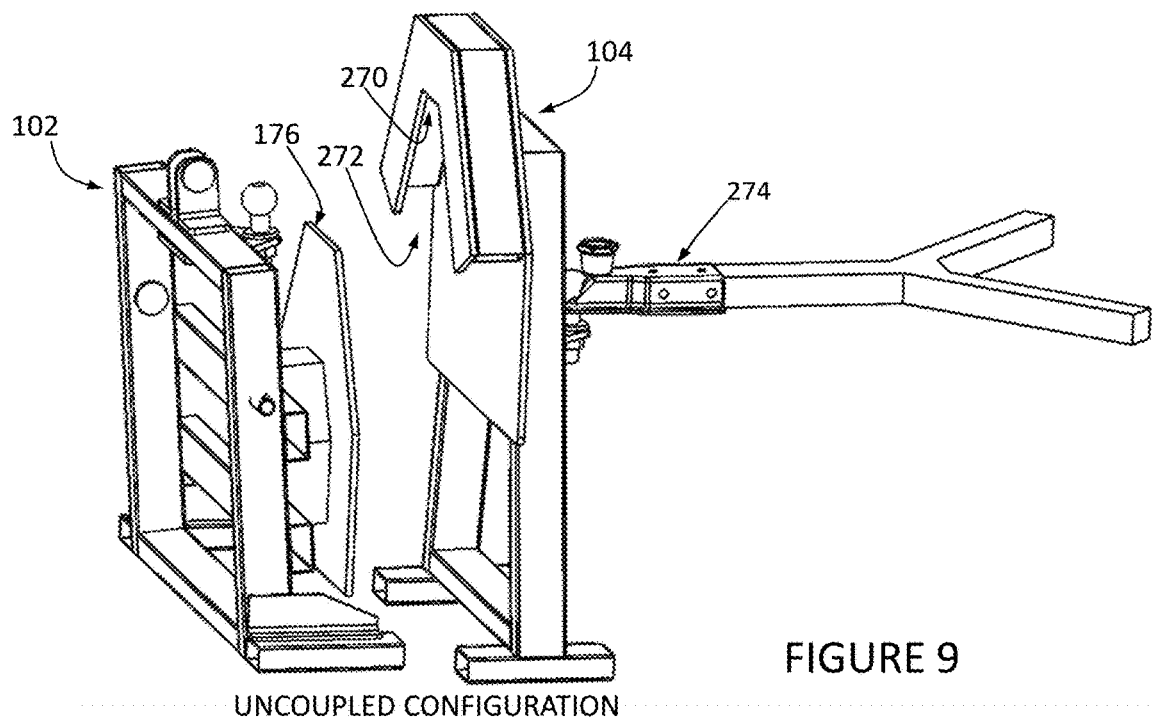
FIG. 9 depicts a top perspective view of the slip hitch system of FIG. 1 in an uncoupled configuration.

As illustrated in FIG. 7, trailer plate 216 is fixed to trailer support frame 200. Here, a midline D of a trailer plate 216 is aligned with a mid-plane C of a trailer support frame 200 (FIG. 8). In preferred embodiments, trailer plate 216 comprises a front face 218 and an opposing rear face 220, a first side face 222 opposing a second side face 224, a top face 226 opposing a bottom face 228, a first oblique face 230, and a second oblique face 232. As illustrated, top face 226 is shorter than bottom face 228 in this embodiment and top face 226 is positioned superior to trailer support frame 200.

Capture plate 234 comprises an inner face 236 opposing an outer face 238, an upper face 240 opposing a lower face 242, a first lateral face 244, a second lateral face 246, a first medial face 248, a second medial face 250, a first end face 252, and a second end face 254. Here, capture plate 234 is substantially 'V' or 'U' shaped. A capture spacer 256 spaces a capture plate 234 from a trailer support frame 200. In this embodiment, capture spacer 256 comprises a medial spacer 258, and laterally opposed first spacer 260 and second spacer 262. A front spacer face 264 and a rear spacer face 266 is disposed on capture spacer 256. First medial face 248 and second medial face 250 and lower face 242 (if present) define a clearance window 272 for passing a portion of a tractor plate 176 threrethrough. Front face 218 of trailer plate 216, inner face 236 of capture plate 234, and inner spacer face 268 of capture spacer 256 define a capture space 270. Capture space 270 is configured in size and shape to removably receive a tractor plate 176 therein. Here, capture space 270 comprises oblique sides to cause a consequent recentering of a tractor plate 176 when mis-alignment between the tractor component 102 and trailer component 104 occurs during coupling. Capture space 270 is sufficiently large wherein a user can back up a tractor plate 176 and be received within a capture space 270 without direct view of the components being coupled. Given in this embodiment that both the tractor plate and trailer plate are flat, stresses are dispersed throughout the plates in the likely event of bumping between the two plates during coupling and uncoupling.

In this embodiment, a second hitch mount 154 is fixed to a surface of a mid-strut 204 of a trailer support frame 200. A hitch ball 158 extends through hitch hole 156 of the second hitch mount 154 and is secured with a hitch nut 160. Hitch hole 156 of the second hitch mount 154 is positioned to the rear of the trailer support frame 200. Hitch hole 156 is positioned vertically.

Figure 17:
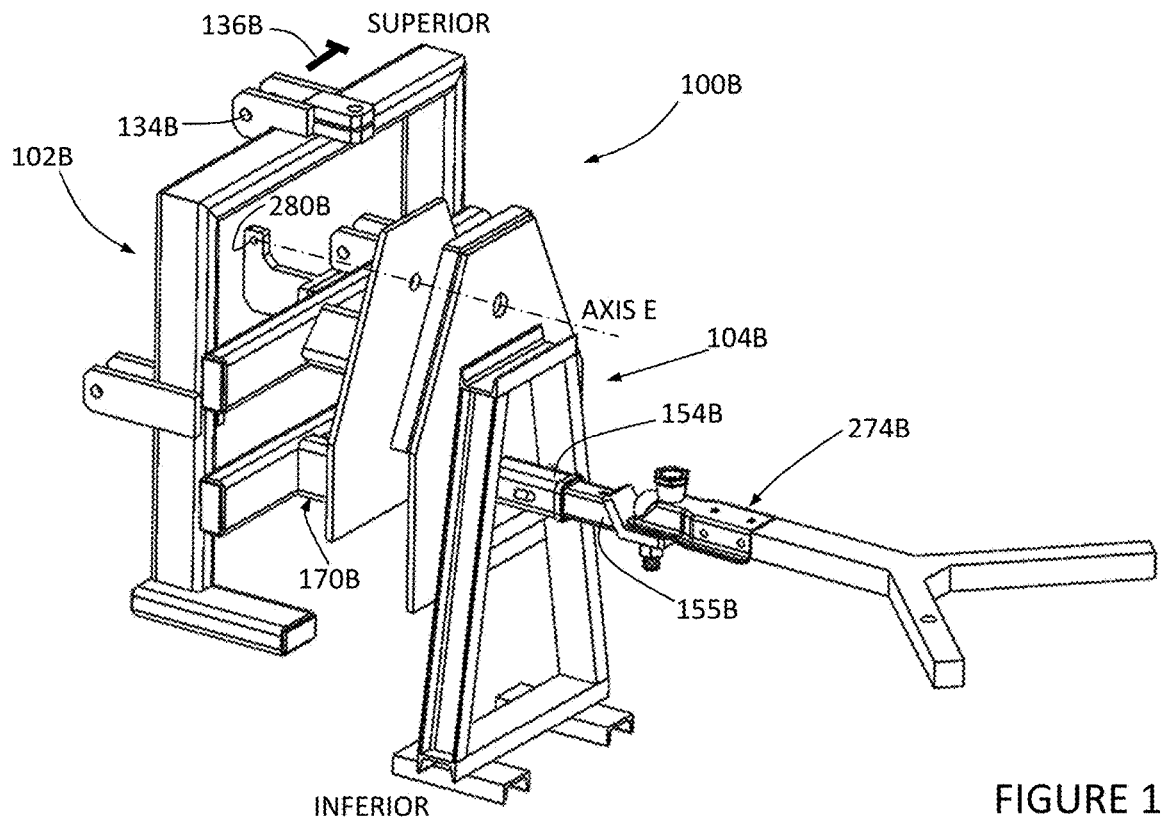
FIG. 17 depicts a top perspective view of a slip hitch system whereas the tractor component and the trailer component are separated.

FIGS. 17-27 illustrate additional embodiments of a Slip Hitch system. FIG. 17 illustrates a preferred embodiment of a tractor component 102B and a trailer component 104B. A portion of a trailer tongue 274B with trailer frame is illustrated as attached to a ball mount 155B secured within a second hitch mount 154B of trailer component 104B. In this embodiment, the tractor support frame 106B is absent a bottom base support. A first side bracket 113B with a first pin hole 114B extending therethrough, extends frontally from a first side support 112B for attachment to a three point hitch of a tractor. A second side bracket 119B with a second pin hole 120B extending therethrough, extends frontally from a second side support 118B also for attachment to a three point hitch of a tractor 101. One or more of a first side bracket 113B and a second side bracket 119B comprise an elongate first side arm 115B and an opposed elongate second side arm 121B here in the form of plates. A first pin hole 114B extends through a front end of the first side bracket 113B and a second pin hole 120B extends through a front end of the second side bracket 119B.

A third pin bracket 128B comprises a first top bracket 130B and a second top bracket 132B which in this embodiment are in the form of plates but may assume other forms. The first top bracket 130B and second top bracket 132B comprise a third pin hole 134B extending generally horizontal therebetween for seating a third lift pin 136B therein.

Hitch hole 156B is positioned rearward from the tractor support frame 106B on first hitch mount 138B. First hitch mount 138B in this embodiment is fixed to a superior side of top base support 108B. Additionally in this embodiment, first hitch mount 138B is fixed between first top bracket 130B and second top bracket 132B. Preferably as before, hitch ball 158B (shown removed) is centered along a midplane (plane A) of tractor support frame 106B.

Figure 18:
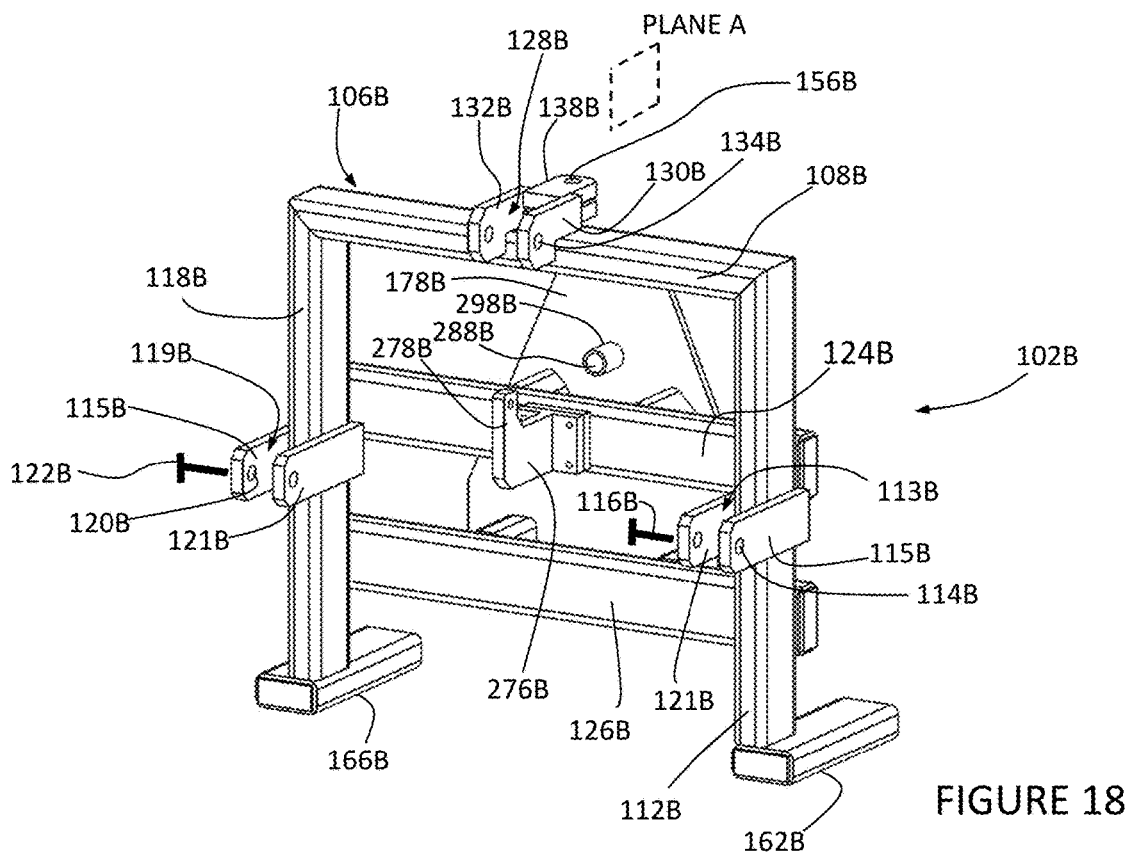
FIG. 18 depicts a front perspective view of the tractor component of the slip hitch system of FIG. 17.
Figure 19:
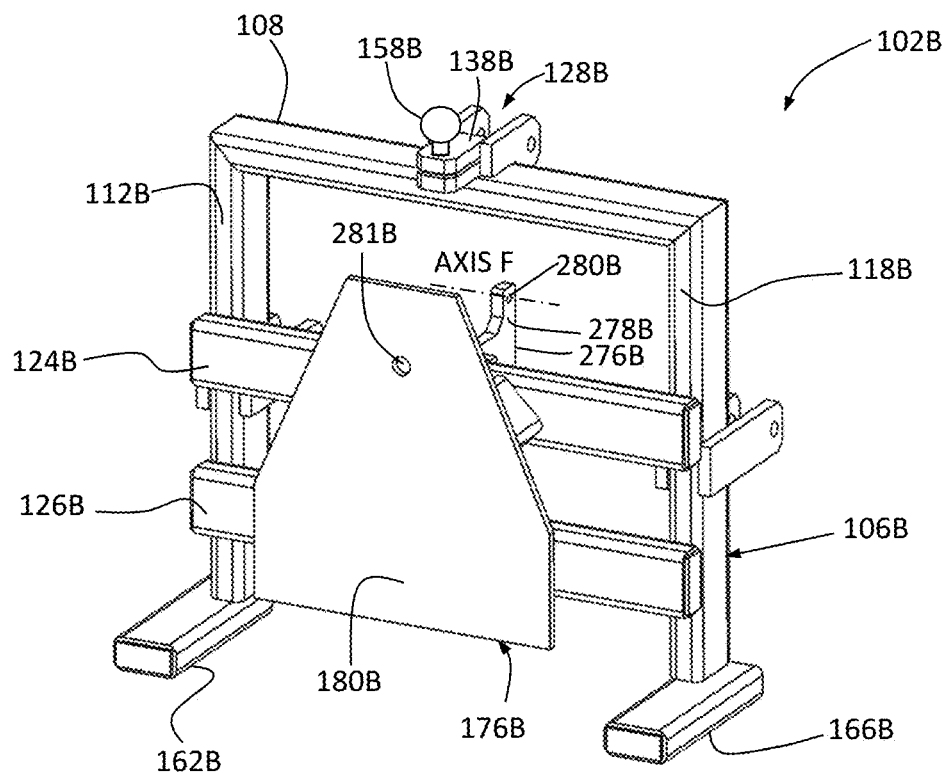
FIG. 19 depicts a rear perspective view of the tractor component of the slip hitch system of FIG. 17.
Figure 20:
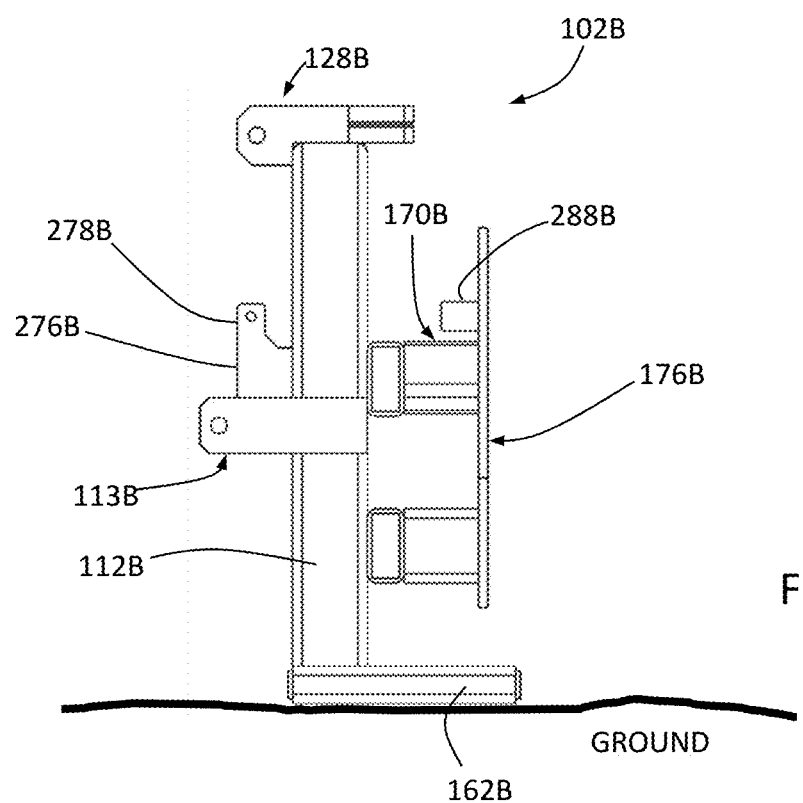
FIG. 20 depicts a side view of the tractor component of the slip hitch system of FIG. 17.
Figure 21:
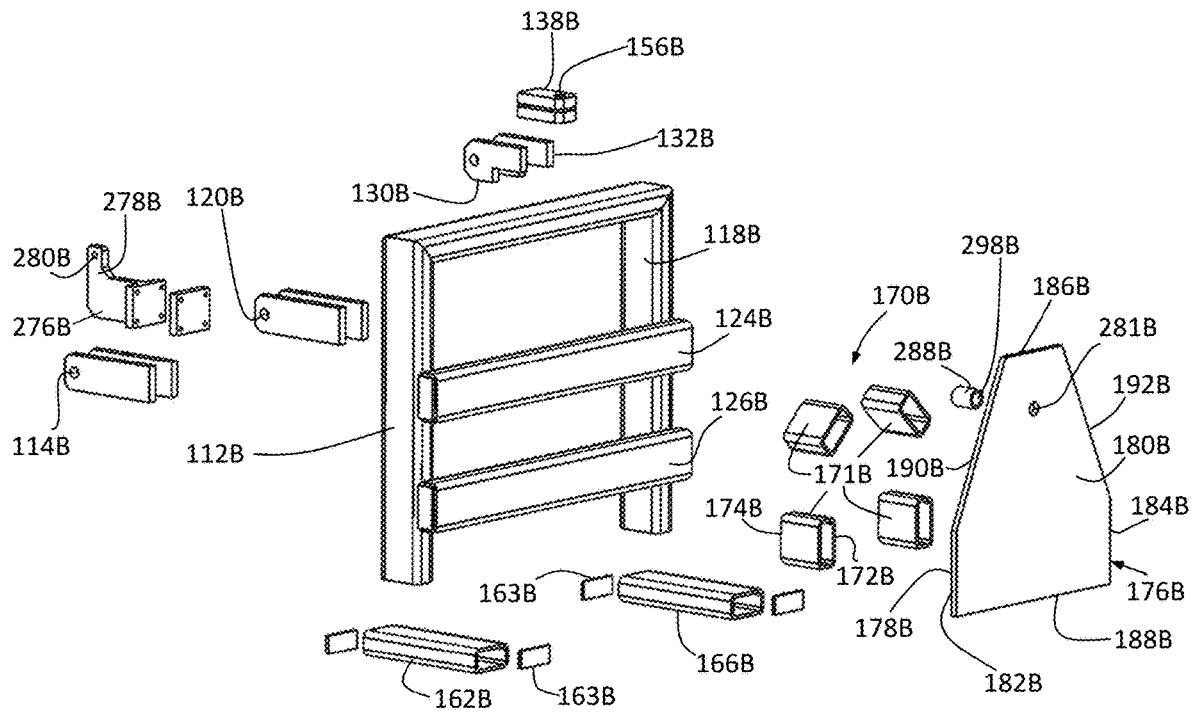
FIG. 21 depicts a rear perspective exploded view of the tractor component of the slip hitch system of FIG. 17.
Figure 22:
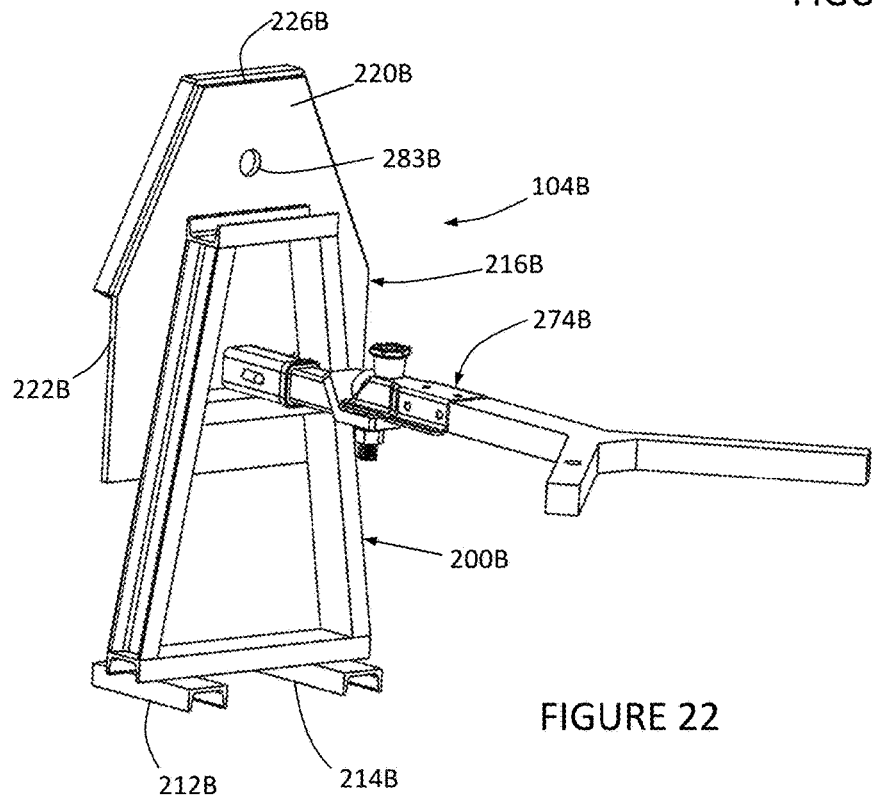
FIG. 22 depicts a rear perspective view of the trailer component of the slip hitch system of FIG. 17.
Figure 23:
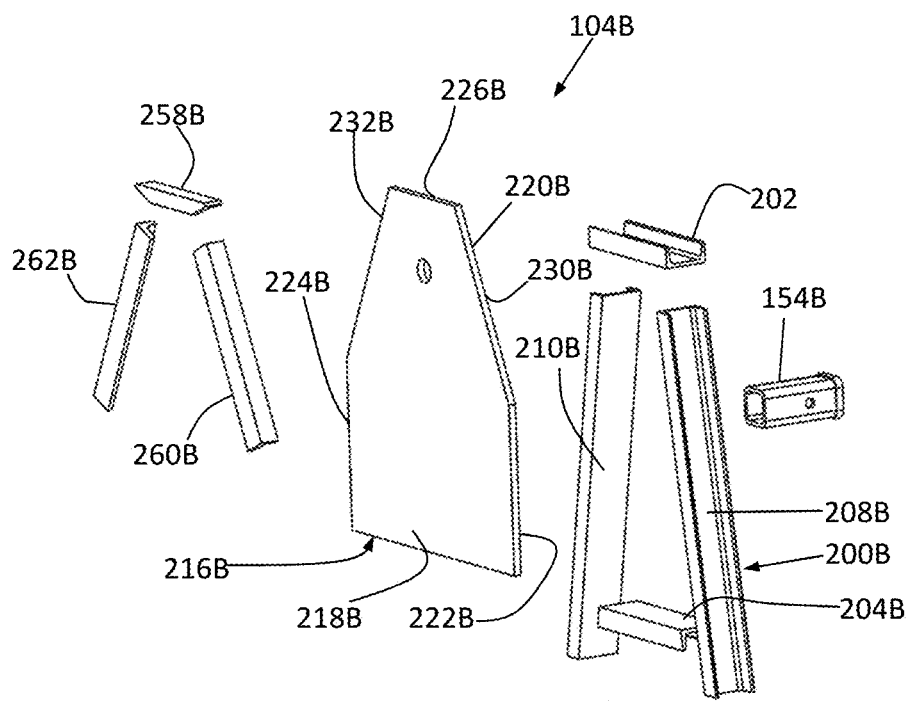
FIG. 23 depicts a front perspective view of the trailer component of the slip hitch system of FIG. 17.
Figure 24:
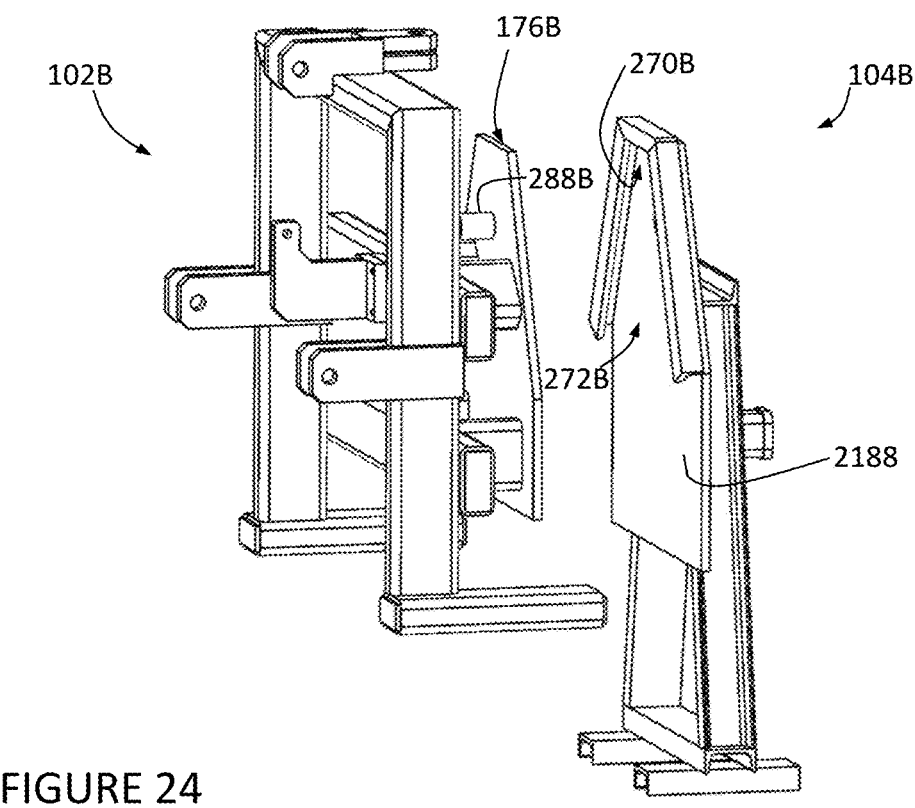
FIG. 24 depicts a side perspective view of the slip hitch system of FIG. 17 in an uncoupled configuration.

First foot 162B and second foot 166B may be manufactured of u-channel or boxed tubing or similar structural elements. When one or more of a first foot 162B and a second foot 166B are positioned on a horizontal ground surface, the tractor support frame stands generally vertical as opposed to previous embodiments. In this embodiment, one or more of a first foot 162B and a second foot 166B are positioned inferior to the respective first side support 112B and second side supports 118B as illustrated in FIG. 18. Tractor plate extension 170B comprises a plurality of plate extension blocks 171B which in this embodiment are generally all the same length. Here, two plate extension blocks 171B are opposed across plane A and extend rearward from a rear face of the first cross support 124B. Additionally, two plate extension blocks are opposed across plane A and extend rearward from a rear face of the second cross support 126B. As illustrated in FIG. 20, tractor plate 176B stands generally vertical when the tractor support frame 106B is standing on its first foot 162B and second foot 166B on a generally horizontal surface.

In a previous embodiment, a third pin bracket 128 is positioned superior to a hitch ball seated in a first hitch mount 138. In the embodiment illustrated in FIG. 19, third pin bracket 128B is positioned level or inferior to a hitch ball 158B that is seated in first hitch mount 138B.

Figure 25:
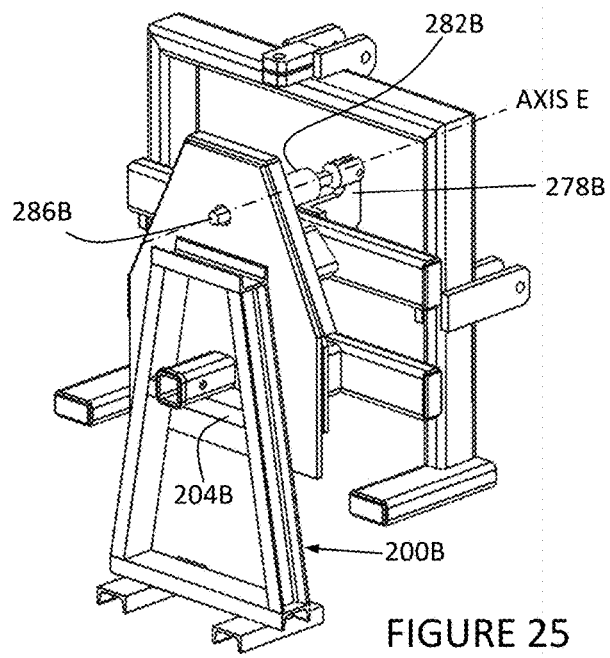
FIG. 25 depicts a top perspective view of the slip hitch system of FIG. 17 whereas the tractor component and the trailer component are interlocked by deployment of a lock plunger.
Figure 26:
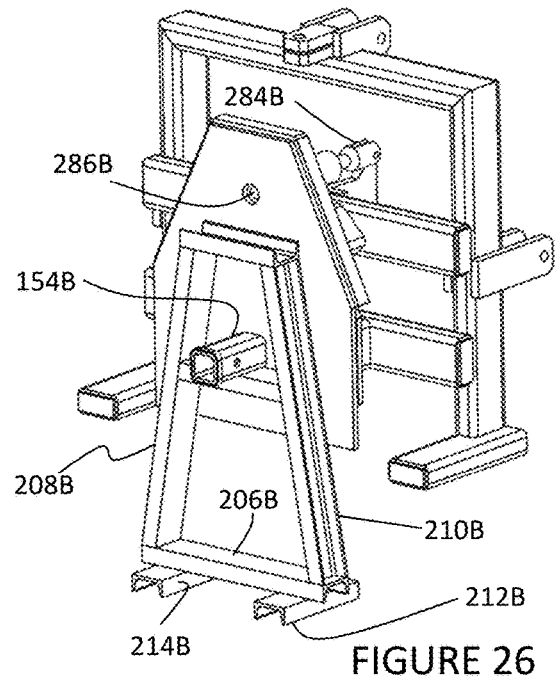
FIG. 26 depicts a top perspective view of the slip hitch system of FIG. 17 whereas the tractor component and the trailer component are free to be separated due to the lock plunger being retracted.
Figure 27:
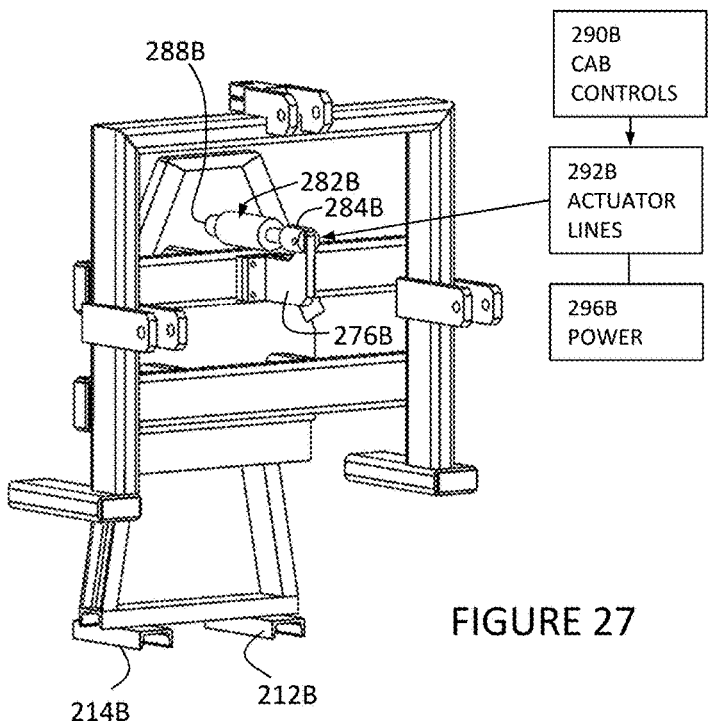
FIG. 27 depicts a front perspective view of the slip hitch system of FIG. 17 with actuator lines for operation of a first actuator.
Figure 28:
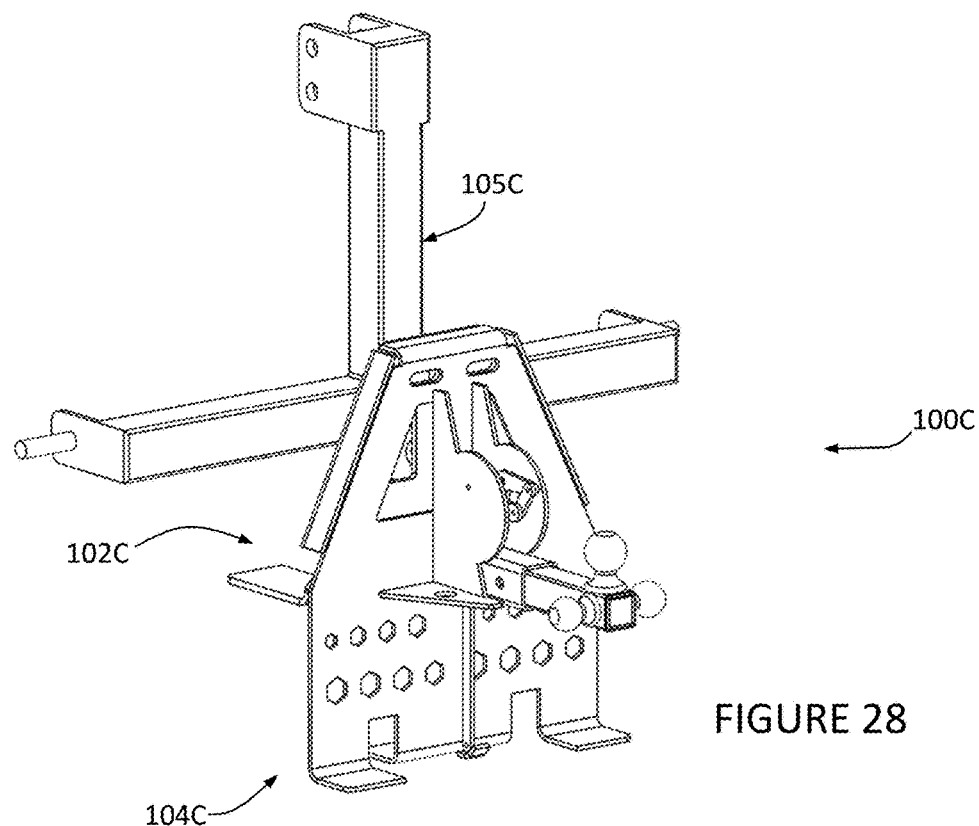
FIG. 28 depicts a rear perspective view of a slip hitch system in a coupled configuration.

A lock base 276B extends frontally from a tractor support frame 106B and is fixed to a frontal side of first cross support 124B using one or more of welds and fasteners. Lock base 276B comprises a superiorly directed lock arm 278B extending from the lock base. A first lock aperture 280B extends through the lock arm 278B for coupling with a first end 284B of a first actuator 282B (FIGS. 25-27). Coupling between first end 284B and first lock aperture 280B is by pin, bolt, or equivalent structure.

Tractor plate 176B in this embodiment, comprises a second lock aperture 281B extending between a front surface 178B and a rear surface 180B for passage of a lock plunger 286B of a first actuator 282B. A plunger guide 288B extends from a frontal surface of tractor plate 176B. Plunger guide 288B is in the form of a tube segment fixed to the front surface 178B of tractor plate 176B. Guide aperture 298B extends through plunger guide 288B to house lock plunger 286B therein for sliding engagement.

A trailer plate 216B comprises a third lock aperture 283B extending between a front face 218B and a rear face 220B for passage of lock plunger 286B of a first actuator 282B. In this embodiment, the first lock aperture 280B, the second lock aperture 281B, and the third lock aperture 283B are aligned within a single plane A. In addition and as illustrated in FIG. 17, the second lock aperture 281B and the third lock aperture 283B are aligned along a common axis E. In addition, the second lock aperture 281B and the third lock aperture 283B are aligned along common axis E which also intersects axis F of the first lock aperture 280B.

Further to this embodiment (FIG. 25-27, actuator is removed in FIGS. 17-24), first actuator 282B comprises a first end 284B for coupling with the first lock aperture 280B of lock arm 276B, and an opposed translatable lock plunger 286B. As illustrated in FIG. 27, the position of lock plunger 286B of first actuator 282B is controlled by a user from controls 290B located within a cab 294 of a tractor. In this embodiment, translatable lock plunger 286B is slidingly housed within guide aperture 298B of plunger guide 288B. First actuator 282B in this embodiment is hydraulic and connected by actuator lines 292B in the form hydraulic lines to a power source 296B such as a hydraulic pump located on the associated tractor 101 or tractor component 104.

In this embodiment (FIG. 17), second hitch mount 154B is in the form of a tube, in this case square for seating a ball mount 155B therein and securing with a removable pin. Hitch mount 154B is secured to a superior surface of mid strut 204B of trailer support frame 200B preferably by welds. End covers 163B may be used to enclose various ends of enclosed tubing used in the system.

Illustrated in FIGS. 28-43 is yet another embodiment of a slip hitch system comprising a tractor component 102C and trailer component 104C. Unlike prior embodiments, slip hitch system 100C is configured for releasable mounting to a standard 3-point hitch 105C (available from various tractor supply vendors) that is mounted to a tractor on its 3-point hydraulic lift system 144. Prior embodiments of the tractor component (i.e. 102B) integrated a three point hitch into the tractor component. As noted in FIG. 18, the tractor component 102B included 3-point hitch mounts extending from a tractor support frame 106B. Tractor support frame 106B comprises a first side bracket 113B, a laterally opposed second side bracket 119B, and superiorly placed third pin bracket 128B thereby integrating a 3-point hitch into the tractor support frame for coupling with first three point arm 146, second three point arm 148, and third three point arm 150 (FIG. 10-12) of a tractor's 3 point hydraulic lift system.

Figure 29:
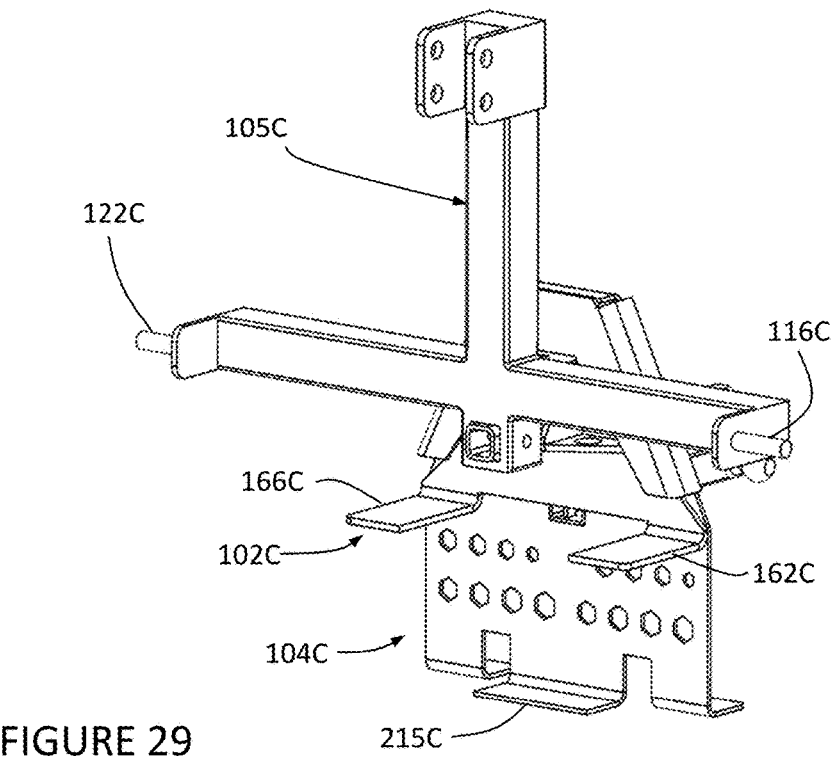
FIG. 29 depicts a front perspective view of the slip hitch system of FIG. 28.
Figure 30:
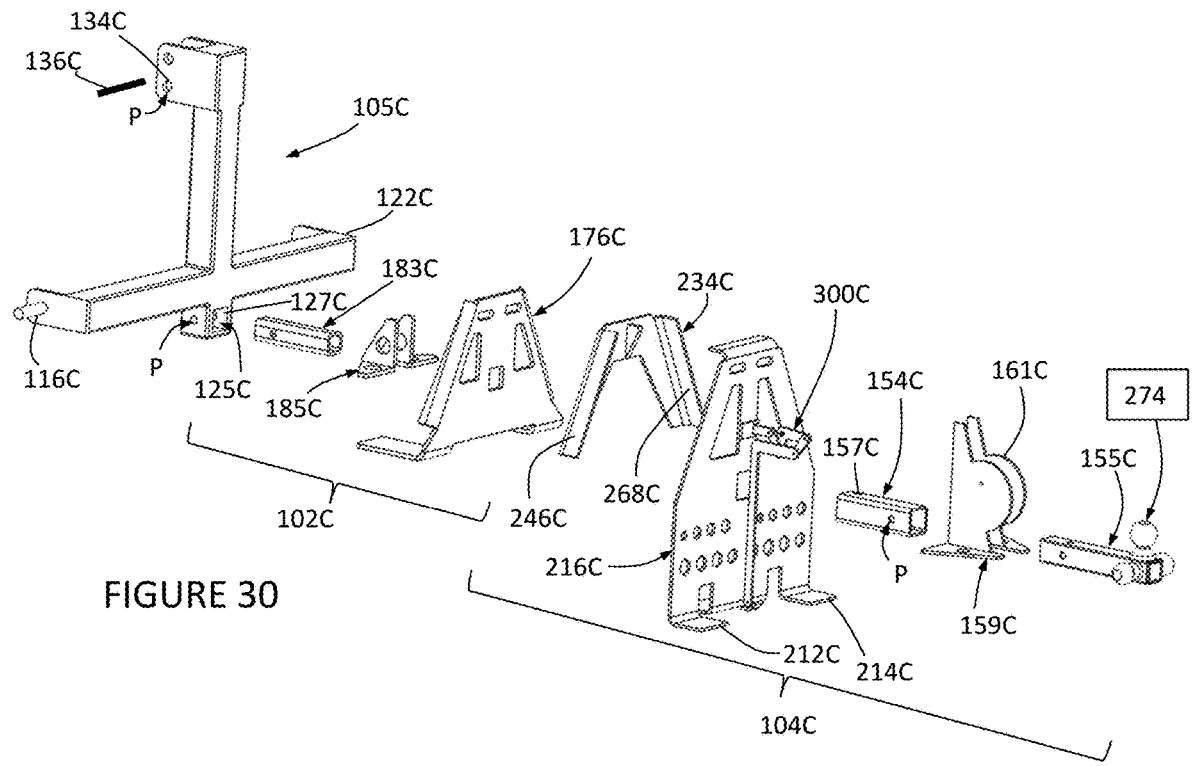
FIG. 30 depicts a rear perspective exploded view of the slip hitch system of FIG. 28.

As best illustrated in FIGS. 29 and 30, 3-point hitch 105C comprises a first lift pin 116C and second lift pin 112C with one or more third pin holes 134C for housing a third lift pin 136C. Each of these couple with respective first three point arm 146, second three point arm 148, and third three point arm 150 for controlled height adjustment of 3-point hitch 105C by an operator. Three point hitch 105C comprises a balless receiver 125C typically of a square profile defined by balless wall 127C. Balless receiver comprises a central axis extending from front to rear and is sized to slidingly house balless mount 183C which is typically in the form of a square tube having a hole for pinning balless mount 183C within balless receiver 125C for releasable fixation. The rear end of balless mount 183C is fixed to tractor plate 176C by welding, fasteners or other means known in the art. In preferred embodiments, balless mount 183C is fixed generally perpendicular to front surface 178C of tractor plate 176C. Balless fixation 185C provides additional fixation support of balless mount 183C to tractor plate 176 C and as illustrated here is in the form of a pair of opposed lateral plates, and inferior placed plate(s). Welds (designated by 'W') or fasteners may be used at various locations within the slip hitch system to join components to each other. These components together form tractor component 102C as illustrated in FIG. 30.

Trailer plate 216C serves as the primary structure of trailer component 104C. In this embodiment, capture plate 234C integrates the functions of both the capture spacer and capture plate illustrated in earlier embodiments into a single metal part in this embodiment that is formed of sheet metal although other fabrication methods may be used. Capture plate 234C is fixed to trailer plate 216C to create clearance window 272C and capture space 270C on the front side of the trailer plate 216C for receiving the superior end of tractor plate 176C therein in a coupled configuration.

Plunger link assembly 300C is secured to the rear side of trailer plate 216C. When the trailer plate 216C is raised from the ground, the linkage is activated as an interlock such that a trailer tongue 274 (with trailer component) cannot be uncoupled from a tractor 101 (tractor component). When the trailer plate 176C is lowered to the ground, the linkage is activated to release the interlock allowing for uncoupling of a trailer from a tractor (trailer component from the tractor component).

Fixed to a rear face 220 of trailer plate 216C is second hitch mount 154C which here is in the form of a generally square tube. The inside dimensions of second hitch mount 154C are sized for housing ball mount 155C therein by sliding engagement and where they may be pinned together at 'P'. Second hitch mount fixation 159C is utilized to provide additional fixation support and in this embodiment comprises a pair of generally vertically spaced plates and a horizontal component. In this embodiment, one of the generally vertical spaced plates serves as a pivot plate 161C with pivot hole 167C extending therethrough which serves as a fixed pivot point for one of the links of plunger link assembly 300C. FIG. 30 illustrates components that together form trailer component 104C in this embodiment.

Figure 31:
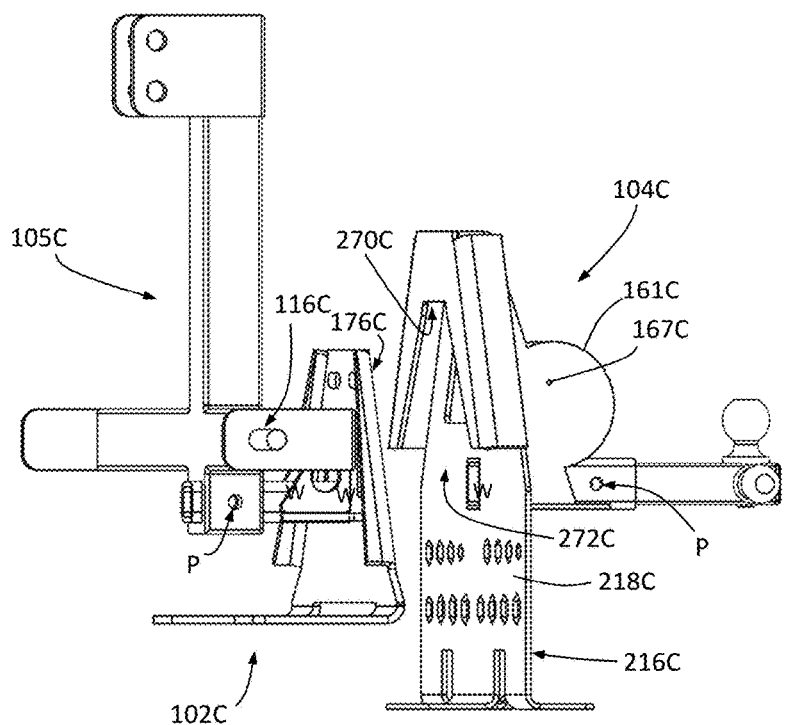
FIG. 31 depicts a side perspective view of the slip hitch system of FIG. 28 but in an uncoupled configuration.
Figure 32:
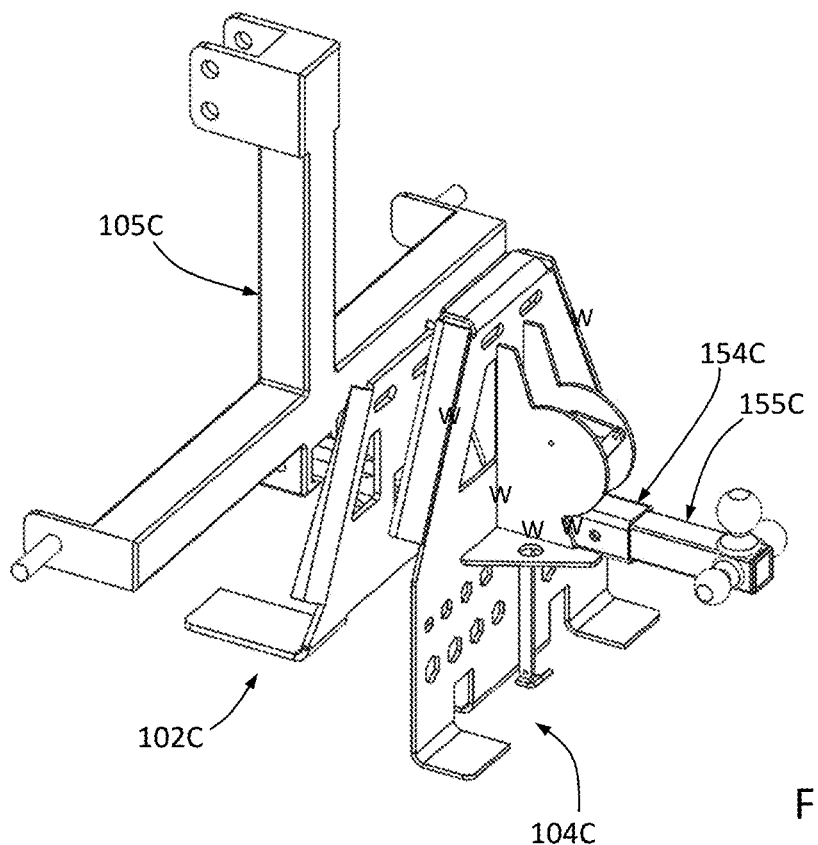
FIG. 32 depicts a top perspective view of the slip hitch system of FIG. 31.
Figure 33:
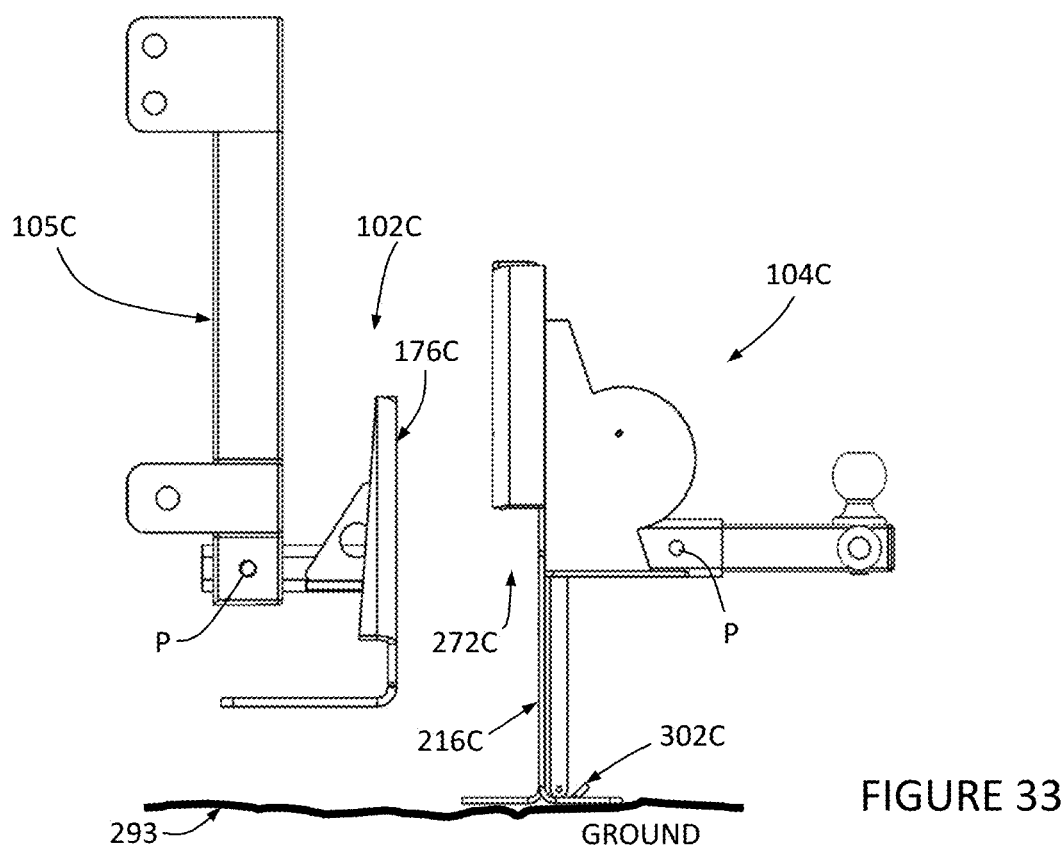
FIG. 33 depicts a side perspective view of the slip hitch system of FIG. 31.
Figure 34:
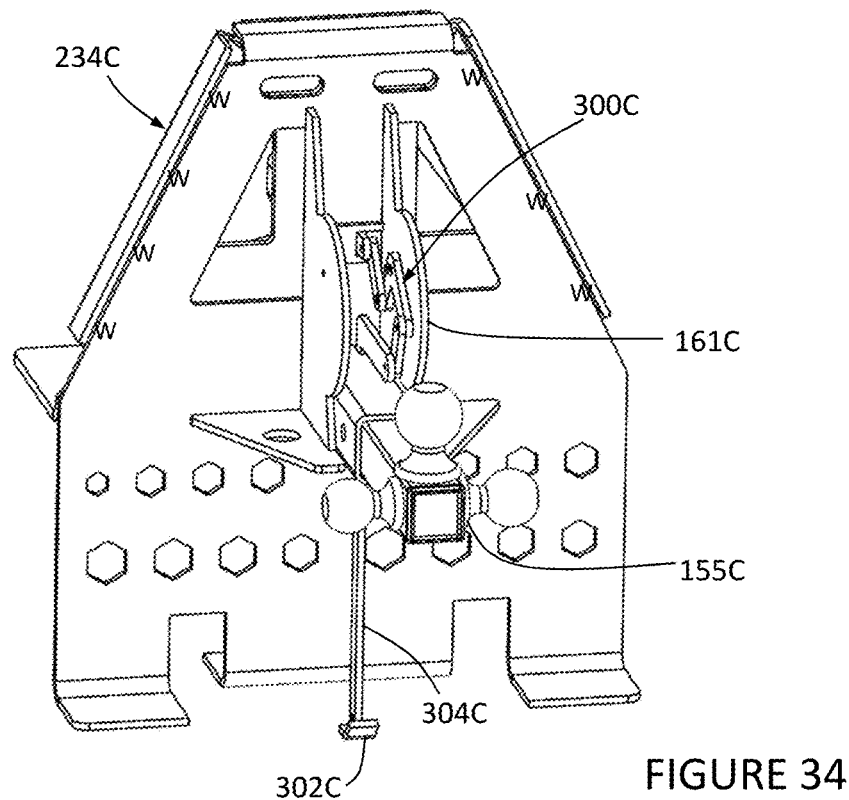
FIG. 34 depicts a rear perspective view of the slip hitch system of FIG. 28 providing a view of its plunger link assembly.
Figure 35:
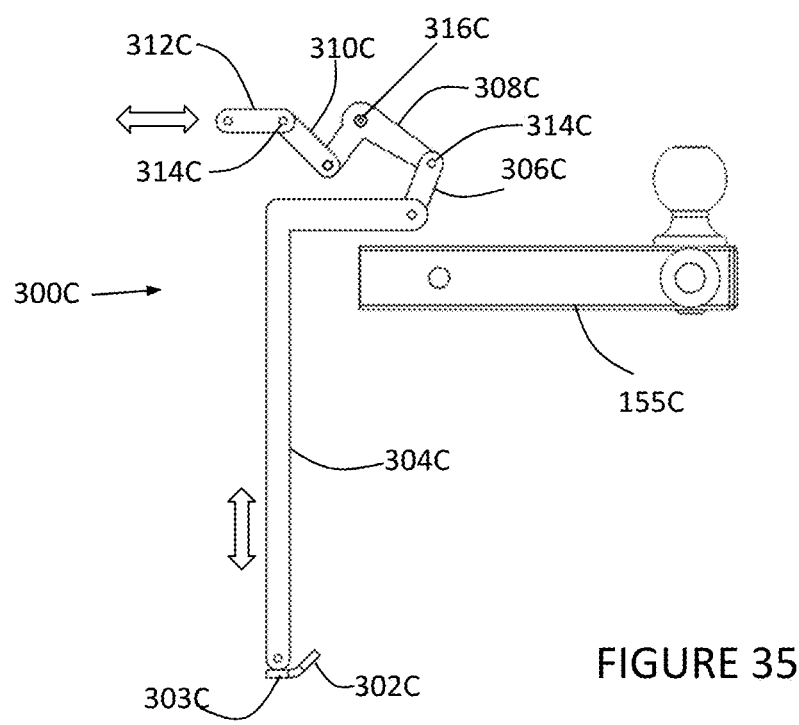
FIG. 35 depicts a side view of the plunger link assembly of the slip hitch system of FIG. 28 with respect to the ball mount.
Figure 36:
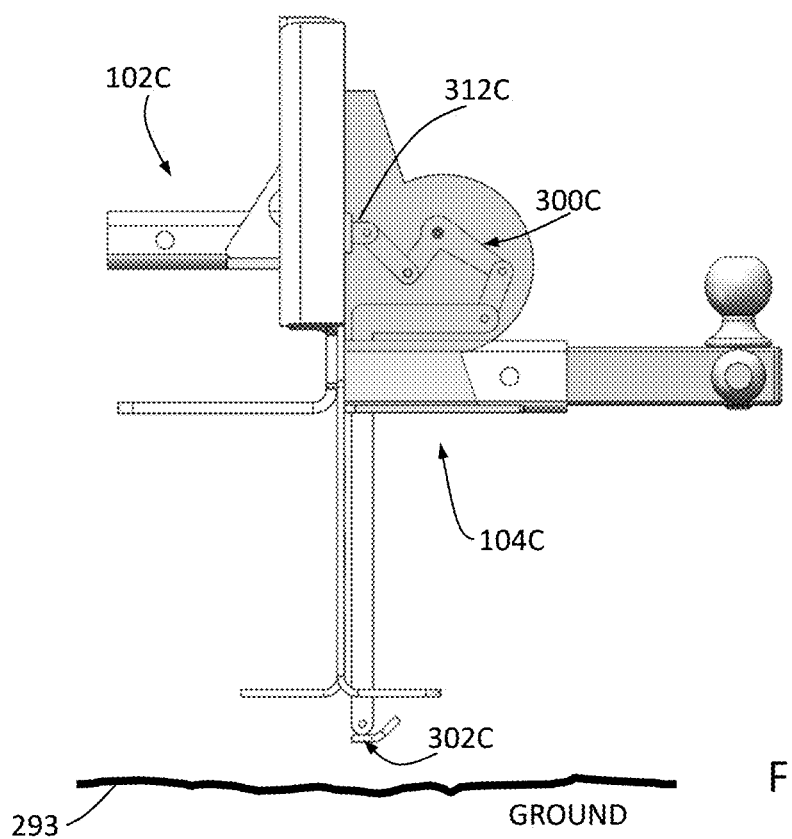
FIG. 36 depicts a side view of the plunger link assembly of the slip hitch system of FIG. 28 whereby a plunger link is deployed for locking between the trailer component and tractor component.

FIGS. 31-33 illustrate tractor component 102C and trailer component 104C in an uncoupled configuration. Tractor component 102C is illustrated extending from a standard 3 point hitch 105C where it is releasably pinned at 'P'. Clearance window 272C provides entry of tractor plate 176C to reside in capture space 270C when the tractor plate 176C and trailer plate 216C approximate and the tractor plate is elevated by the tractor's 3 point hydraulic lift system. Note that by consequence of the trailer plate 216C resting on ground 293, link foot 302C is generally aligned with the inferior end of trailer plate 216C thereby disengaging the locking linkage. This is further illustrated in FIGS. 34-37 whereby plunger link assembly 300C comprises a series of pinned links. In this embodiment, plunger link assembly 300C comprises link foot 302C having a sole 303C configured for engagement with a ground surface. Here, link foot 302C is pivotally secured to first link 304C which is pivotally secured to second link 306C, which is pivotally secured to pivot link 308C, which is pivotally secured to third link 310C, which is pivotally secured to plunger link 312C. Pivot link 308C comprises a fixed pivot 316C comprising a pin extending to align with pivot hole 167C of pivot plate 161C. First link 304C extends vertically through and is supported by linkage aperture 157C of second hitch mount 154C. The trailer component 104C is consequently elevated when tractor component 102C is elevated by the tractor's 3 point hydraulic lift. When this happens, link foot 302C drops causing a consequent chain reaction through the linkage having the final consequence of plunger link 312C to translate forward and interlocking with tractor plate 176C thereby preventing their unexpected separation during use (FIG. 36). Vertical dropping of link foot 302C is limited by interference between a horizontal portion of first link 304C and an upper surface of second hitch mount 154C. Conversely, trailer component 104C is consequently lowered when tractor component 102C is lowered by the tractor's 3 point hydraulic lift. Link foot 302C is forced upward by the ground 293 (FIG. 37) causing a consequent chain reaction through the linkage having the final consequence of plunger link 312C to translate rearward and disengaging with tractor plate 176C. This provides unlocking thus enabling an uncoupled configuration between the tractor component and the trailer component.

Figure 38:
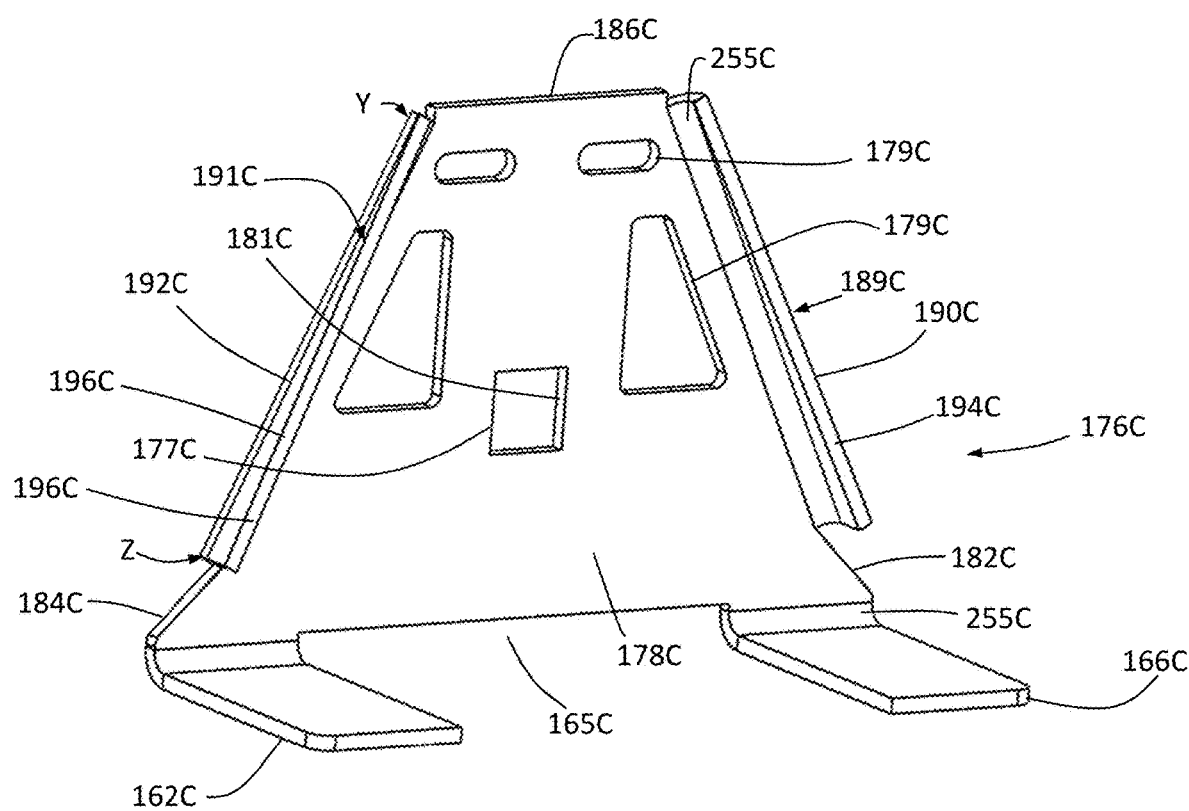
FIG. 38 depicts a front perspective view of the tractor plate of the slip hitch system of FIG. 28.
Figure 39:
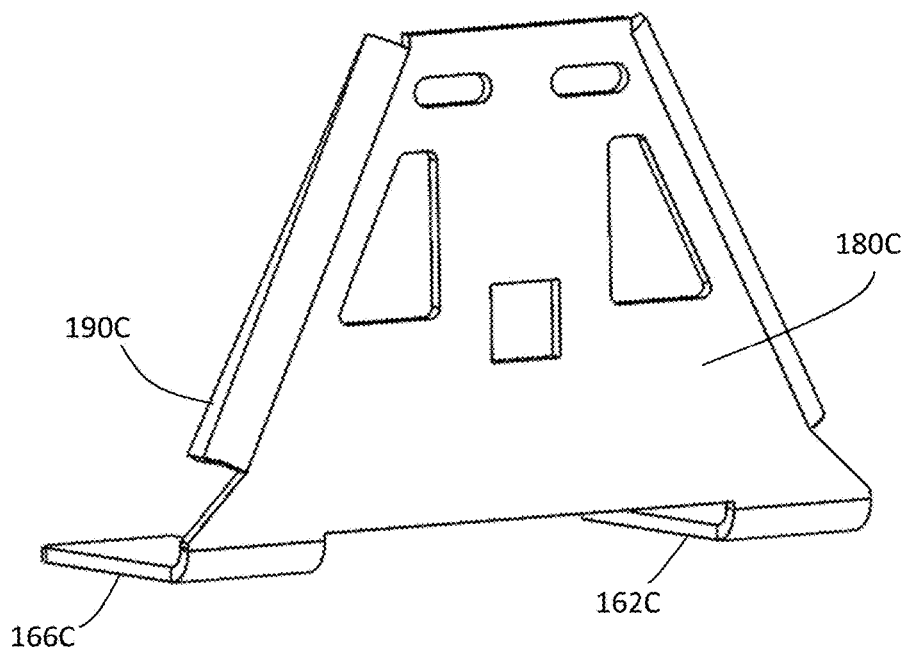
FIG. 39 depicts a rear perspective view of the tractor plate of the slip hitch system of FIG. 28.

FIGS. 38-39 provide a detailed view of one embodiment of a tractor plate 176C. Tractor plate 176C comprises a generally vertical front surface 178C spaced from an opposing generally vertical rear surface 180C. At a superior end is a generally horizontal top surface 186C extending between the front surface and rear surface. Spaced laterally are an opposing first oblique flange 189C and second oblique flange 191C extending frontally. Laterally on the first oblique flange is a first oblique surface 190C with an opposed second oblique surface 192C on the second oblique flange 191C whereby the oblique surfaces are angled towards each other superiorly and away from each other inferiorly. Rearwardly from first oblique surface 190C is first wedge surface 194C, whereas rearwardly from second oblique surface 192C is second wedge surface 196C. The first wedge surface 194C and the second wedge surface 196C slope whereby the inferior ends of these surfaces (at 'Z') have a greater distal spacing from front surface 178C than at the superior ends (at 'Y') thereby establishing a wedge effect. This feature causes a tightening during coupling of the tractor component and trailer component as the tractor plate is raised into capture space 270C. At an inferior end, a first foot 162C and a second foot 166C are laterally spaced and extend rearward generally perpendicular to rear surface 180C. The first foot and second foot provide upward stability to the tractor plate when set on a ground surface. A mid relief 165C separates the two feet. When formed of sheet metal, various sheet metal bends are present 255C. One or more weight reliefs (cutouts) may extend between rear surface 180C and front surface 178C. In addition, a first receiver hole 177C extending between rear surface 180C and front surface 178C is defined by a generally square first receiver hole wall 181C. First receiver hole 177C houses a rear end of balless mount 183C and may comprise a weld therebetween for fixation.

Figure 40:
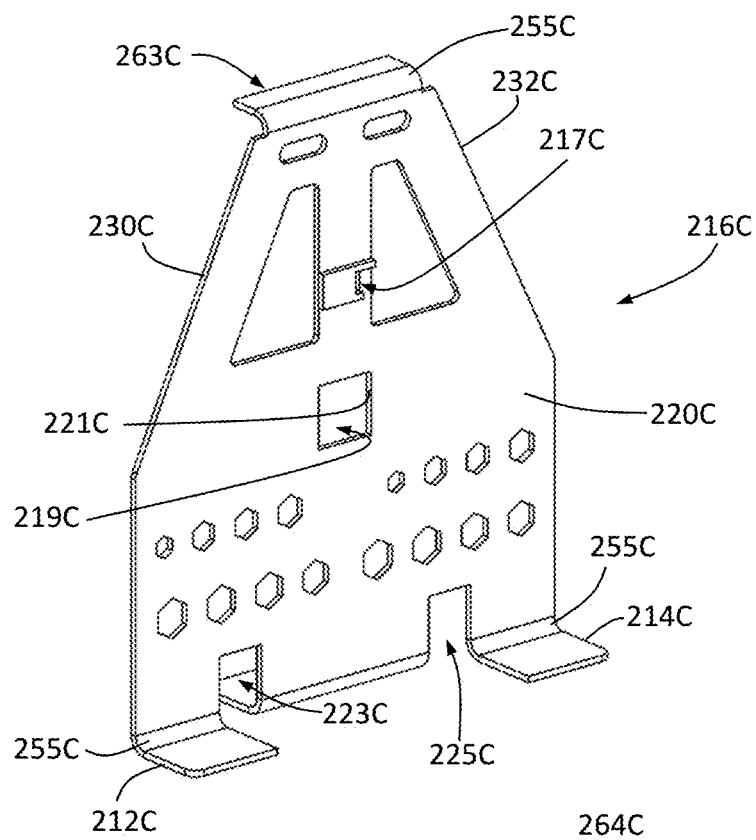
FIG. 40 depicts a rear perspective view of the trailer plate of the slip hitch system of FIG. 28.
Figure 41:
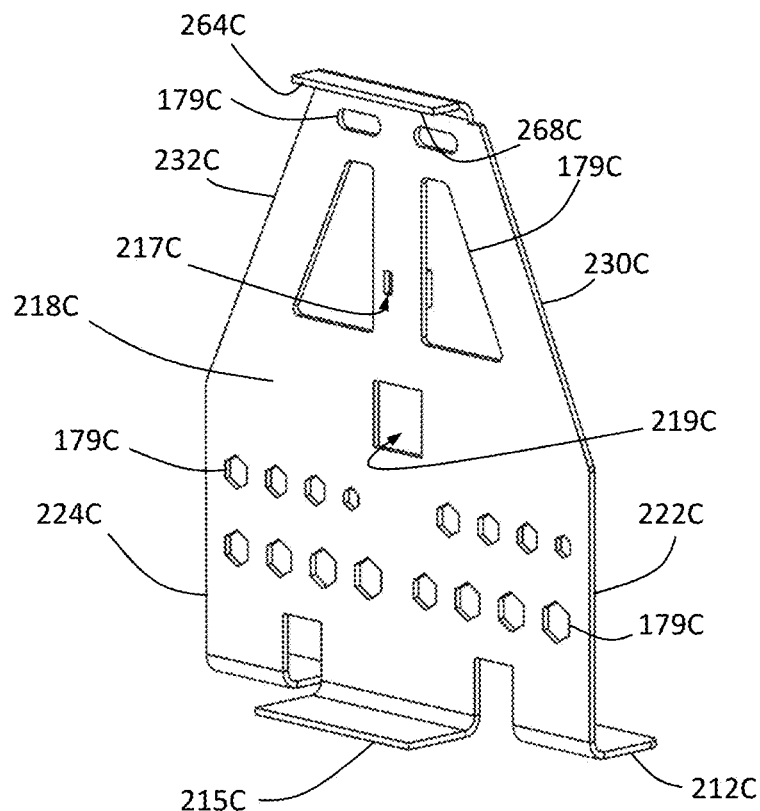
FIG. 41 depicts a front perspective view of the trailer plate of the slip hitch system of FIG. 28.

FIG. 40-41 provide a detailed view of one embodiment of a trailer plate 216C. Trailer plate 216C comprises a generally vertical front face 218C spaced from an opposing generally vertical rear face 220C. Extending from the superior end is forward facing superior flange 263C having a forward facing front spacer face 264C and an inferior facing inner spacer face. At an inferior end, a first pod 212C and a second pod 214C are laterally spaced and extend rearward generally perpendicular to rear surface 180C. The first pod and second pod provide upward stability to the trailer plate when set on a ground surface. A third pod 215C separates the first pod and second pod with a first relief 223C and a second relief 225C positioned between the pods. When formed of sheet metal, various sheet metal bends are present 255C. Extending obliquely from a superior end and diverging from a superior end is an opposed first oblique face 230C and second oblique face 232C. The first oblique face 230C intersects inferiorly with a generally vertical first side face 222C whereas the second oblique face 232C intersects inferiorly with a generally vertical second side face 224C. As one skilled in the art might recognize, it is preferred the wedge profile of the tractor plate and the wedge profile of the capture space complement each other. This complementary profile may assume a variety of shapes other than that as illustrated. For example, the tractor plate may assume a more rounded moon shape. These alternatives all fall within the spirit of this invention. Further to trailer plate 216C, one or more weight reliefs 179C (cutouts) may extend between rear face 220C and front face 218C. In preferred embodiments, the cutouts may be configured for use as a tool such as to remove a nut from a hitch (i.e. hexagonal shape). In addition, a second receiver hole 219C extending between rear face 220C and front surface 218C is defined by a generally square second receiver hole wall 221C. Second receiver hole 219C houses a rear end of second hitch mount 154C and may comprise a weld therebetween for fixation. A plunger aperture 217C extends between front face 218C and rear face 220C and is sized and shaped for passage of a locking plunger such as plunger link 312C.

Figure 42:
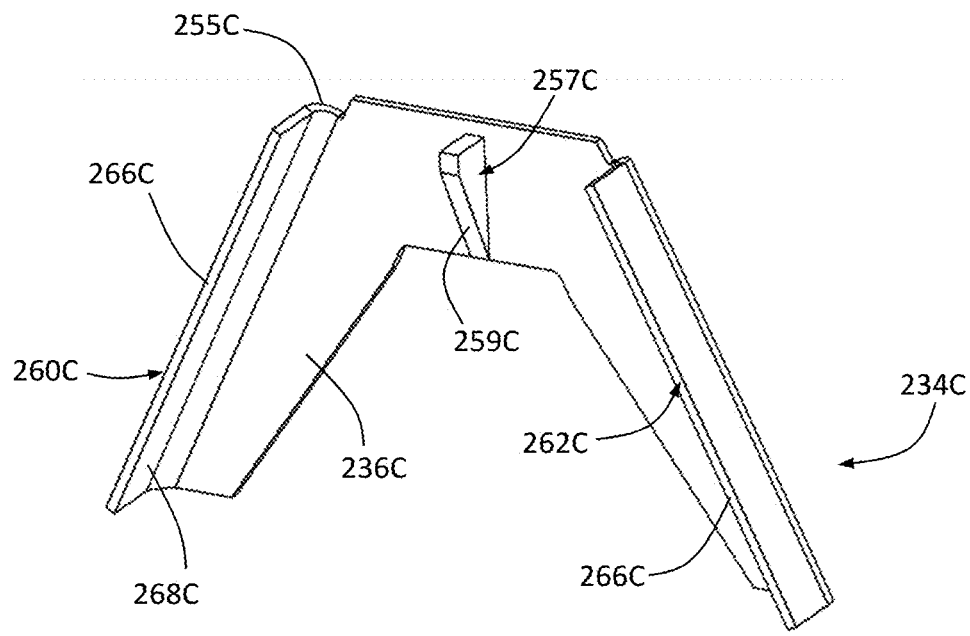
FIG. 42 depicts a front perspective view of the capture plate of the slip hitch system of FIG. 28.
Figure 43:
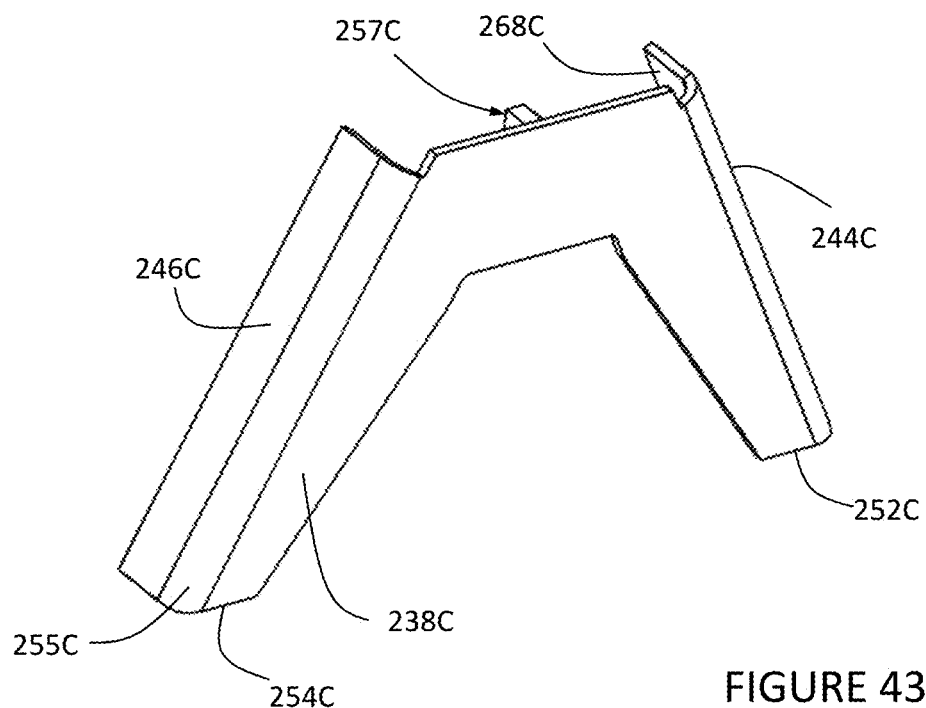
FIG. 43 depicts a rear perspective view of the capture plate of the slip hitch system of FIG. 28.

FIG. 42-43 illustrate one embodiment of a capture plate 234C configured to create a capture space 270C such as illustrated in FIG. 31. Here, capture plate 234C is welded (as indicated by 'W') in FIG. 34 between rear spacer face 266C to one or more of rear face 220C, first oblique face 230C, and second oblique face 232C. In this embodiment, capture plate 234C is generally 'U' or 'V' shaped comprising an inner face 236C spaced from an outer face 238C. Opposing first spacer 260C and second spacer 262C in the form of oblique flanges extend perpendicularly and rearwardly terminating in a rear spacer face 266C. First spacer 260C and second spacer 262C diverge from a superior end to an inferior end. Protruding from inner face 236C is capture boss 257C having slide face 259C angled to tighten against tractor plate 176C as it enters capture space 270C. Capture plate 234C terminates inferiorly at first end face 252C and second end face 254C. Again, one or more sheet metal bends 255C may be present when the part is formed of sheet metal. During use, the first oblique surface 190C and second oblique surface 192C seat against inner spacer face 268C in a coupled configuration.

Figure 14:
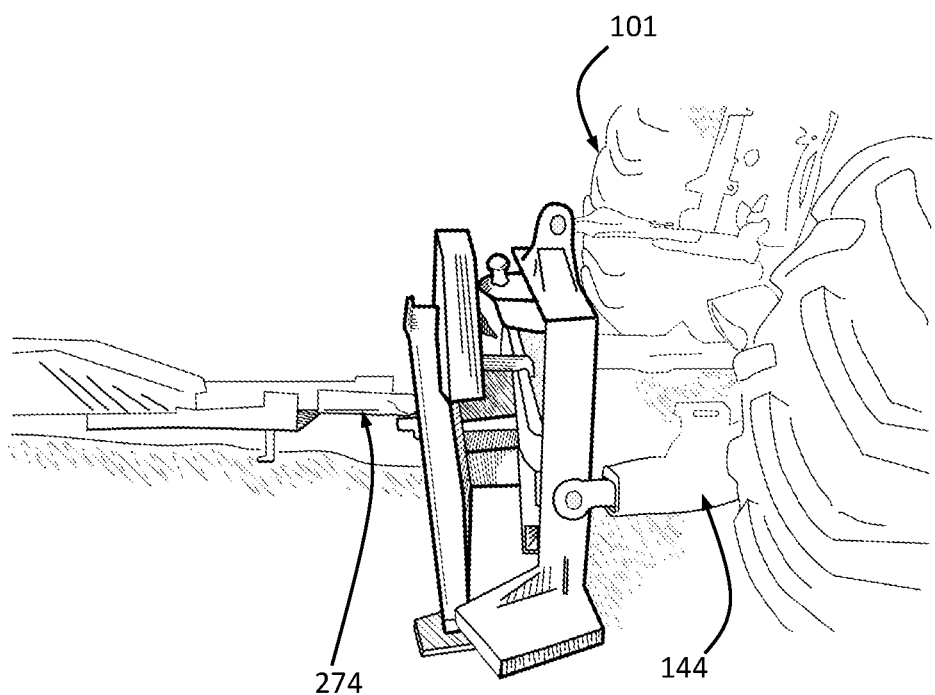
FIG. 14 depicts a side perspective view of a tractor with a slip hitch system whereby the tractor plate is lowered through a clearance window.

As those skilled in the art would expect, components of a slip hitch system (i.e. 100/100B/100C) are fixed together by one or more of; welds, holes and fasteners, and fixation plates. Further, skilled artisans will recognized that a variety of manufacturing methods may be used to create components of the various assemblies. For this reason, many of the individual components of a given assembly may be considered 'portions' with alternative manufacturing practices. For example, capture spacer 256 comprising individual components medial spacer 258, first spacer 260, and second spacer 262, may alternatively be manufactured from a single bent tube. In this configuration, the single bent tube would comprise a medial spacer portion, a first spacer portion, and a second spacer portion. Similarly, skilled artisans will recognize that various components may be manufactured of alternative materials wherein for example, a tube may be substituted with a C-channel and yet perform substantially the same function (i.e. trailer support frame FIG. 8 versus FIG. 14).

Figure 13:
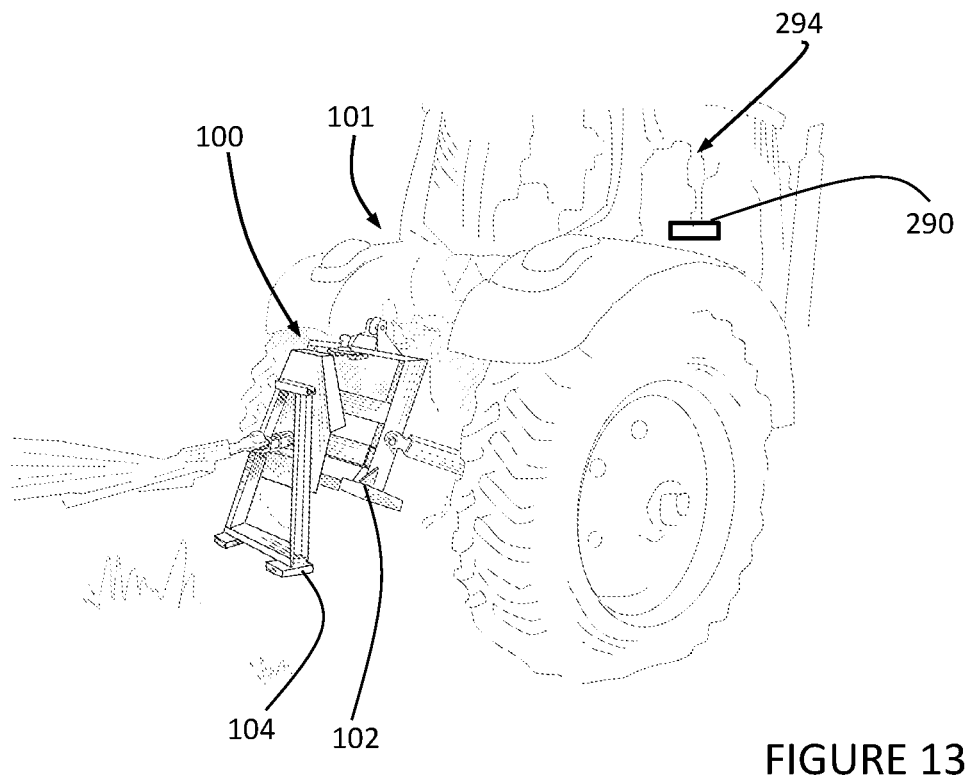
FIG. 13 depicts a rear perspective view of a tractor with a slip hitch system with the tractor component engaged with the trailer component in a coupled configuration.

In a preferred method of use of one embodiment of a slip hitch system 100, a tractor component 102 (FIG. 4, 5) resides generally upright on a ground surface at least partially supported by at least one of a first foot 162 and a second foot 166. A user backs a tractor having a three point hydraulic lift 144 to the front side of the tractor component 102. The first three point arm 146, second three point arm 148, and third three point arm 150 of the three point hydraulic lift 144 are connected to the respective first lift pin 116, second lift pin 122, and third lift pin 136 of the tractor component 102 (FIG. 10-12). Each arm is optionally locked by placement of a retension pin 143 through each retension hole 142. The user activates the three point hydraulic lift 144 to elevate lifting the tractor component 102 from the ground. If the trailer component 104 is not already coupled, the user locates a trailer component 104 and positions the trailer component 104 upright ground balanced on one or more of a first pod 212 and a second pod 214 (FIG. 7). The user backs the tractor towards the trailer component 104 and activates the three point hydraulic lift 144 to lower the tractor component 102 sufficient for the tractor plate 176 to pass through the clearance window 272 of the trailer component 104. Once the tractor position places the tractor plate 176 behind the capture plate 234 of the trailer component 104, the user again activates the three point hydraulic lift 144 to lift the tractor component 102 causing a consequent positioning of the trailer plate 216 within the capture space 270 (FIG. 13). Due to the complementing obliquely positioned inner spacer faces 268 of the capture spacer 256, the trailer plate 216 self-aligns. If a trailer is not already attached to a trailer component 104, the user raises the three point hydraulic lift 144 then backs the coupled slip hitch system 100 to a trailer tongue 274. The three point hydraulic lift 144 is lowered, and a trailer tongue 274 is mounted over a hitch ball 158 extending from the second hitch mount 154. The user again activates the three point hydraulic lift 144 to elevate the trailer component 104 and directs the tractor with coupled trailer to its new destination.

Figure 15:
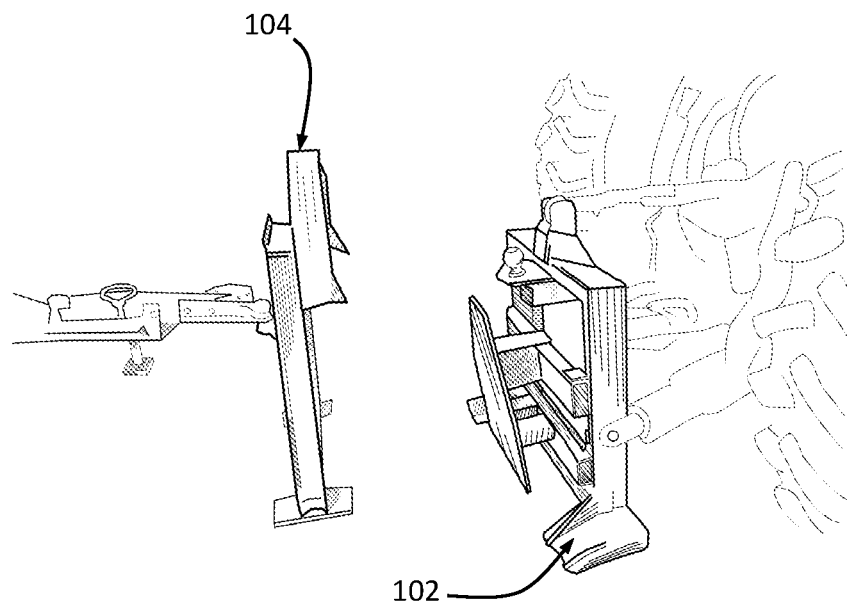
FIG. 15 depicts a top side perspective view of the trailer component with attached trailer and the tractor component mounted to a tractor in an uncoupled configuration.
Figure 16:
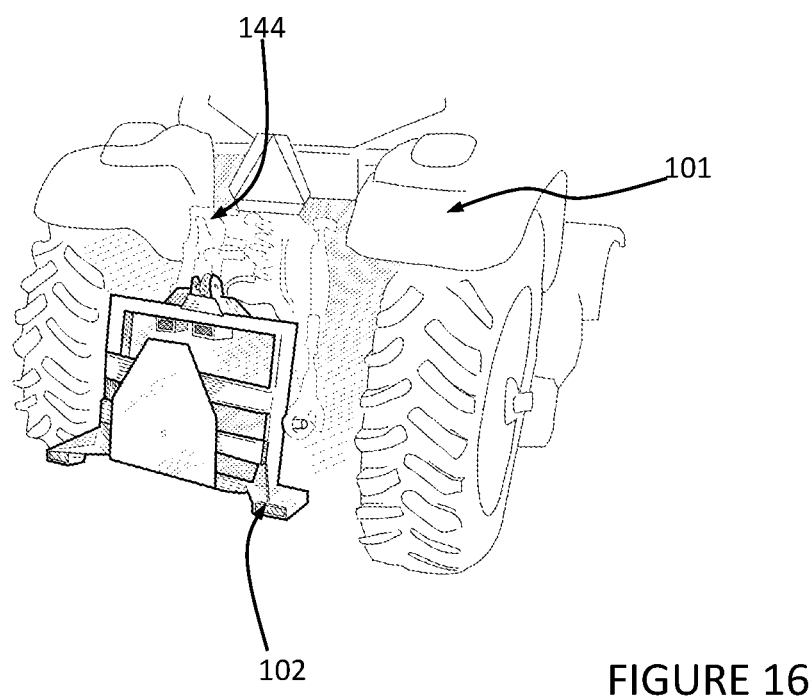
FIG. 16 depicts a rear perspective view of a tractor with elevated tractor component prepared to relocate and engage with the next trailer with trailer component.

Once at its new destination, the user activates the three point hydraulic lift 144 such that the tractor plate 176 is lowered sufficiently (FIG. 14) to ground the trailer component 104 and for the tractor plate 176 to be lowered to clear the capture plate 234 through the clearance window 272. Given the next trailer to be moved is pre-equipped with a trailer component 104 (FIG. 15), the user drives to the next trailer, lowers the tractor component 102 then elevates once coupled. As noted here, it is unnecessary for the user to leave the seat of the tractor once the tractor component 102 is fitted to the three point hydraulic lift 144 of a tractor 101 and trailer components 104 are pre-coupled to each trailer.

In a preferred embodiment, the method of use is accordingly adjusted when the three point hydraulic lift 144 is connected to a standard 3 point hitch 105C rather than directly to the tractor component 102C. In this configuration, a balless mount 183C on the tractor component 102C slidingly engages a balless receiver 125C on the 3 point hitch 105C (FIG. 31) and is pinned thereby securing the tractor component 102C to the 3 point hitch 105C.

Figure 37:
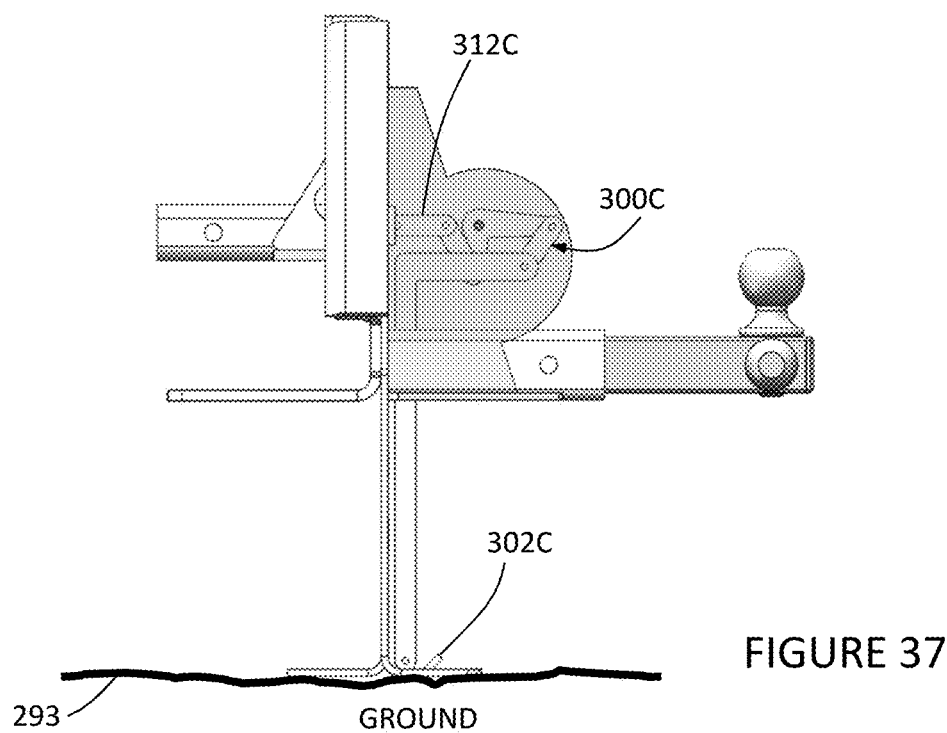
FIG. 37 depicts a side view of the plunger link assembly of the slip hitch system of FIG. 28 whereby a link foot is elevated causing retraction of the plunger link and consequent unlocking between the trailer component and tractor component.

Further, in a preferred embodiment, a method of obtaining a locked configuration between a tractor component 102C and trailer component 104C comprises use of a plunger link assembly 300C (FIG. 34-37). In this method, anytime the trailer component 104C is lowered to a ground surface, a link foot 302C is pushed superiorly causing consequent translation of a plunger link 312C to engage the tractor component 102C with consequent locking between the tractor plate 167 and trailer component 104C (FIG. 36). In a method of obtaining an unlocked configuration between the tractor component and trailer component, anytime the trailer component is raised from a ground surface, the link foot is lowered by gravity or spring bias causing consequent translation of the plunger link 312C to disengage the tractor component 102C with consequent unlocking between the tractor component 102C and trailer component 104C (FIG. 37).

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A tractor and trailer coupling system comprising:
    a tractor component;
    said tractor component operable to releasable fixation to at least one of: a three point tractor hitch, and a three point lift of a tractor;
    a trailer component operable for attachment to a trailer;
    said tractor component comprising an upward standing tractor plate with an opposed front surface and rear surface;
    said tractor plate comprising an upward facing top surface on a superior end;
    said tractor plate comprising a first oblique surface opposed to a second oblique surface;
    said first oblique surface and second oblique surface laterally spaced;
    said first oblique surface and second oblique surface angled towards each other superiorly and away from each other inferiorly;
    at least one foot positioned inferiorly at said tractor plate operable to provide upward stability to said tractor plate when on a ground surface;
    said trailer component comprising an upward standing trailer plate with an opposed front face and rear face;
    said trailer component comprising a capture plate;
    said capture plate coupled to said trailer plate;
    said capture plate having an inner face spaced from said front face of said trailer plate;
    an inner spacer face;
    said inner spacer face extending between said inner face and said front face;
    wherein superiorly said inner spacer face, inner face, and said front face define a capture space; and
    wherein inferiorly said capture space opens to a clearance window.

2. The tractor and trailer coupling system of claim 1 wherein in a coupled configuration, the superior end of said tractor plate is seated in said capture space of said trailer component.

3. The tractor and trailer coupling system of claim 1 wherein said tractor plate is raised through said clearance window of said trailer component when moving from an uncoupled configuration to a coupled configuration.

4. The tractor and trailer coupling system of claim 1 wherein said tractor plate is lowered through said clearance window of said trailer component when moving from a coupled configuration to an uncoupled configuration.

5. The tractor and trailer coupling system of claim 1 wherein in a coupled configuration, one or more inner oblique surfaces of said tractor plate are captured between opposing said inner spacer faces of said capture space of the trailer component.

6. The tractor and trailer coupling system of claim 1 wherein said trailer component comprises a hitch ball coupled to a rear side of said trailer component and operable to couple with a trailer tongue.

7. The tractor and trailer coupling system of claim 1 wherein said trailer component comprises one or more inferiorly positioned pods on said trailer component operable to holding said trailer component upright when resting on said ground surface.

8. The tractor and trailer coupling system of claim 1 wherein said tractor component comprises a pair of laterally spaced lift pins and a superiorly placed lift pin operable to fixate to a 3 point tractor lift.

9. The tractor and trailer coupling system of claim 8 wherein said pair of laterally spaced lift pins and said superiorly placed lift pin are positioned generally horizontal.

10. The tractor and trailer coupling system of claim 1 wherein said tractor component further comprises a forward extending balless mount operable to fixate to a 3 point tractor hitch.

11. The tractor and trailer coupling system of claim 1 wherein said tractor component further comprises a first actuator operating a lock plunger operable to prevent unintended separation between said tractor component and said trailer component.

12. The tractor and trailer coupling system of claim 1 wherein said trailer component further comprises a plunger link assembly operable to prevent unintended separation between said tractor component and said trailer component.

13. The tractor and trailer coupling system of claim 12 wherein a pivot link of said plunger link assembly pivots about a fixed pivot extending from a pivot plate that extends from said trailer plate.

14. The tractor and trailer coupling system of claim 13 wherein said plunger link assembly is operable to retract said plunger link when an inferior end of said plunger link assembly rests against said ground surface.

15. The tractor and trailer coupling system of claim 1 wherein said trailer plate further comprises a plunger aperture for housing at least one of a retractable: lock plunger, and a plunger link.

16. The tractor and trailer coupling system of claim 1 wherein said tractor component is raised and lowered by operation of cab controls of said tractor.

17. The tractor and trailer coupling system of claim 1 wherein said capture plate comprises a capture boss extending from an inner face of said capture plate operable for self-alignment of said tractor plate within said capture space.

18. The tractor and trailer coupling system of claim 1 further comprising:
   a first wedge surface and a second wedge surface extending rearwardly from said respective first oblique surface and second oblique surface;
   and wherein said first wedge surface and said second wedge surface have a greater distal spacing from said front surface of said tractor plate.

19. The tractor and trailer coupling system of claim 1 wherein said first foot and said second foot extend forward from said trailer plate.

20. The tractor and trailer coupling system of claim 1 wherein at least one of said pods extends frontally from said trailer plate and at least one of said pods extends rearwardly from said trailer plate.

* * * * *